July 28, 1959     P. S. SMITH     2,896,503
MULTI-CAMERA IMAGE-PRODUCTION AND CONTROL
Filed March 8, 1956     10 Sheets-Sheet 1
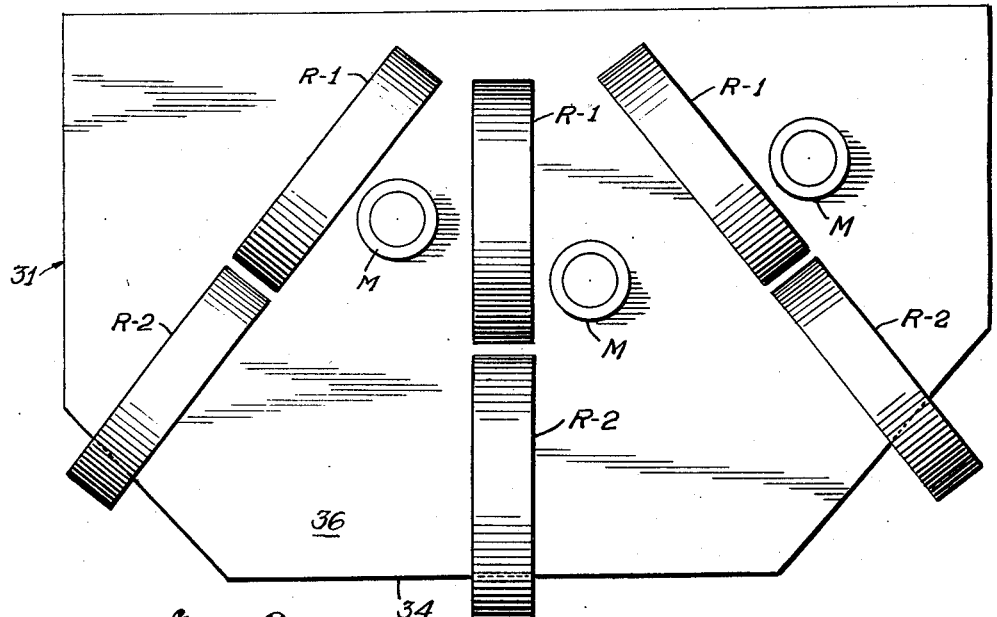
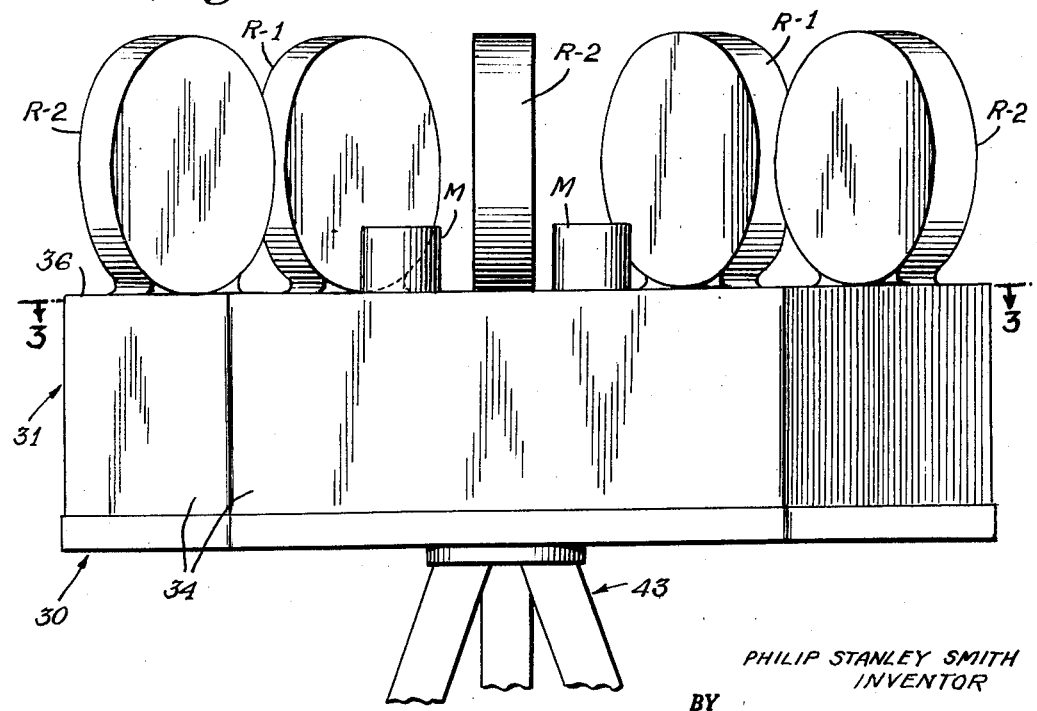
PHILIP STANLEY SMITH
INVENTOR
BY William T. Kniesner
ATTORNEY July 28, 1959 P. S. SMITH 2,896,503
MULTI-CAMERA IMAGE-PRODUCTION AND CONTROL
Filed March 8, 1956 10 Sheets-Sheet 2
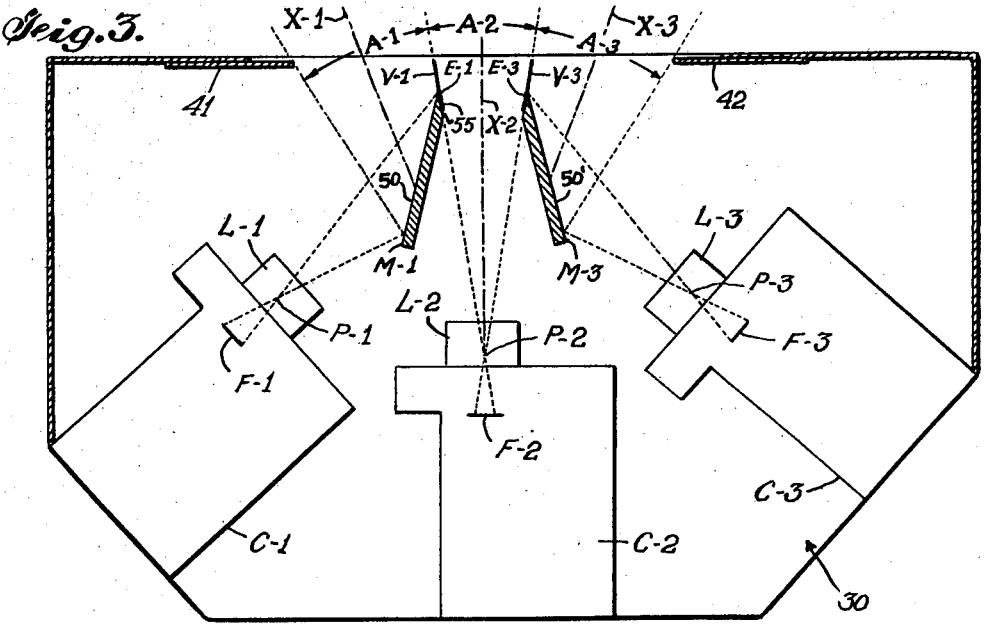
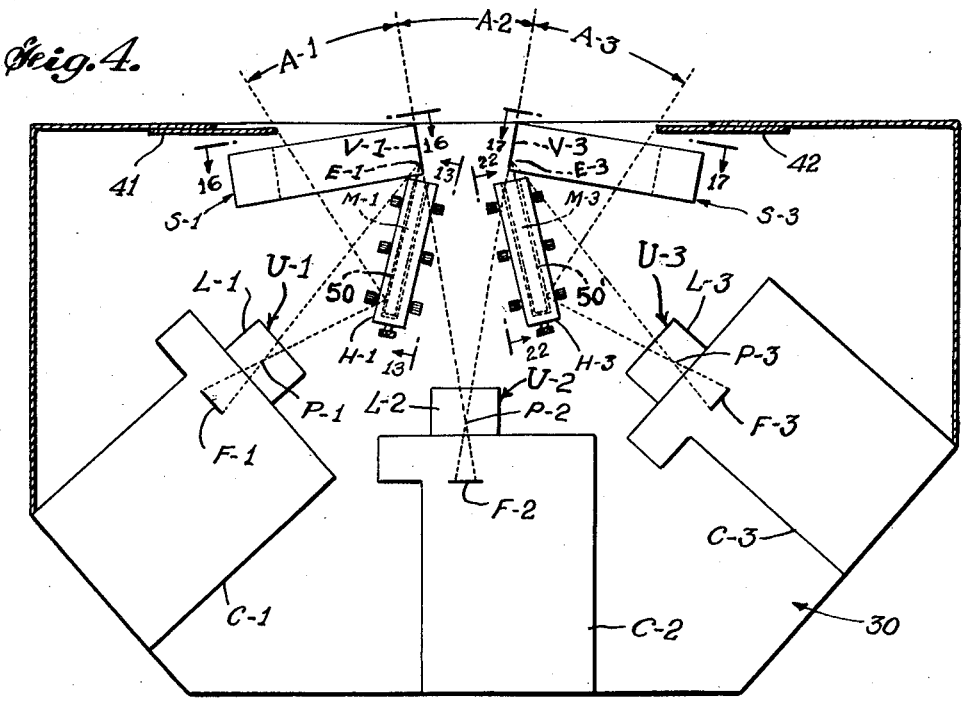
PHILIP STANLEY SMITH
INVENTOR
BY
William T. Kriesmer
ATTORNEY

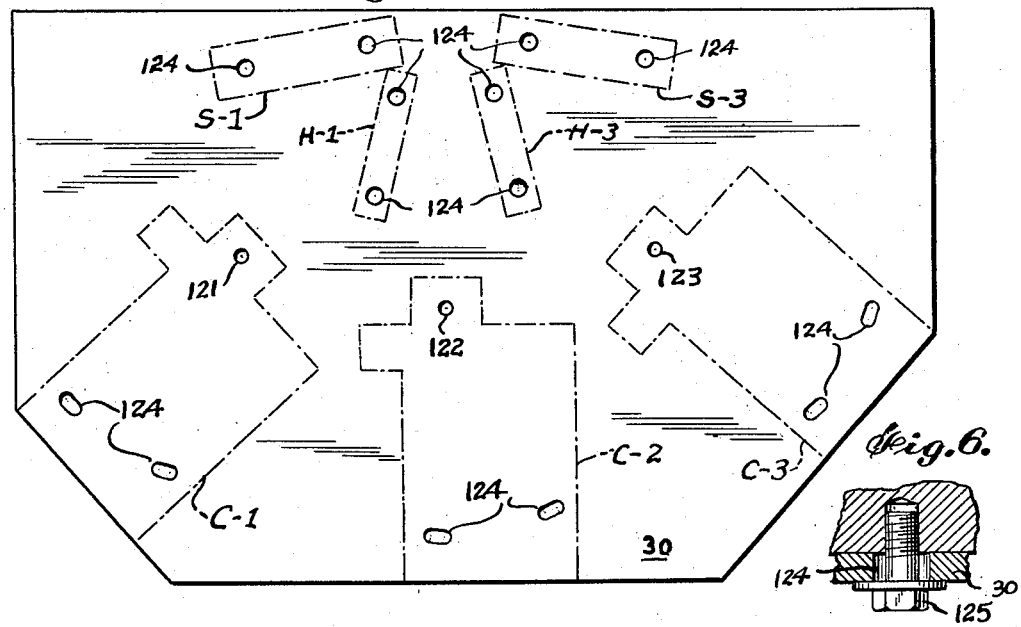

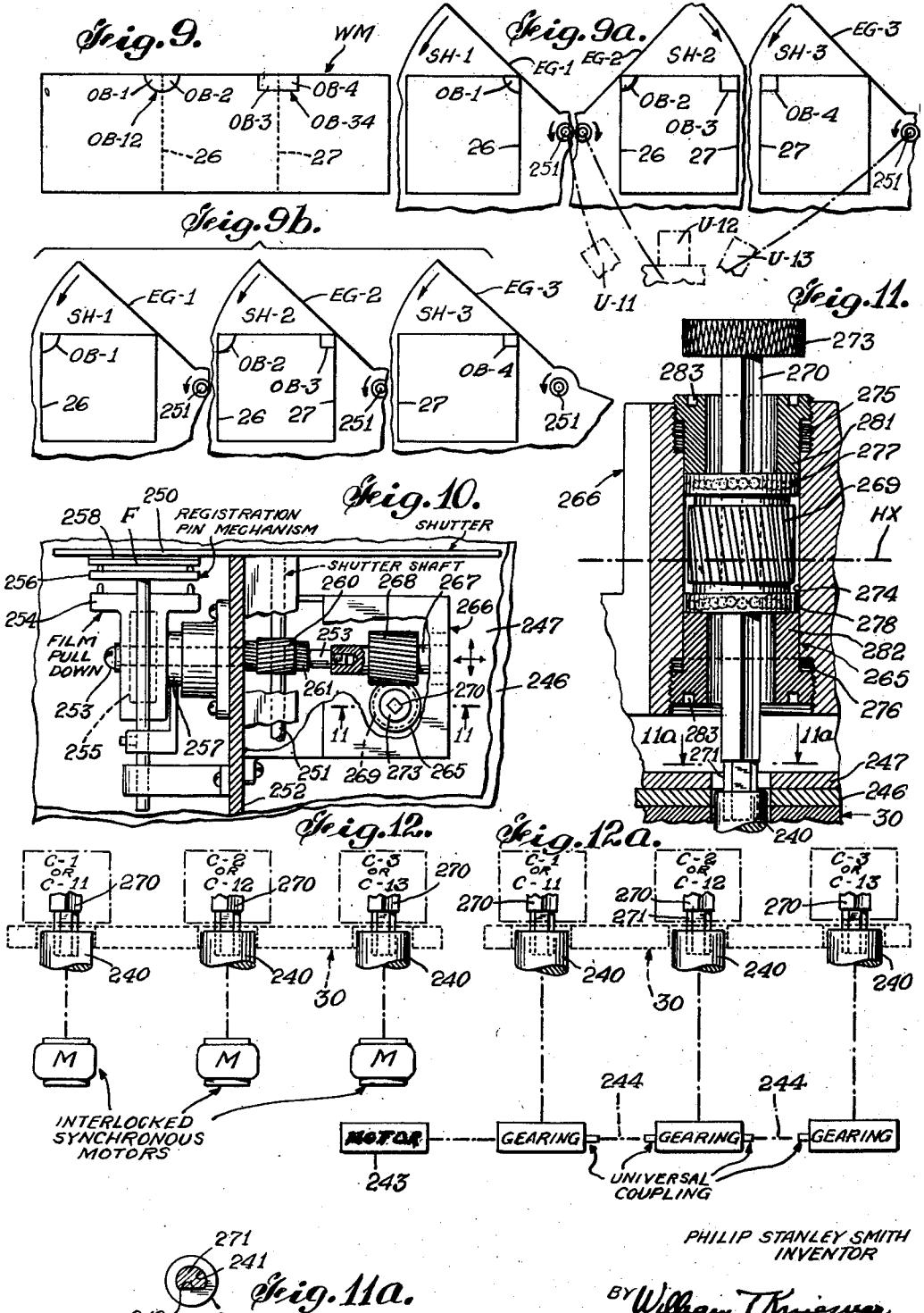

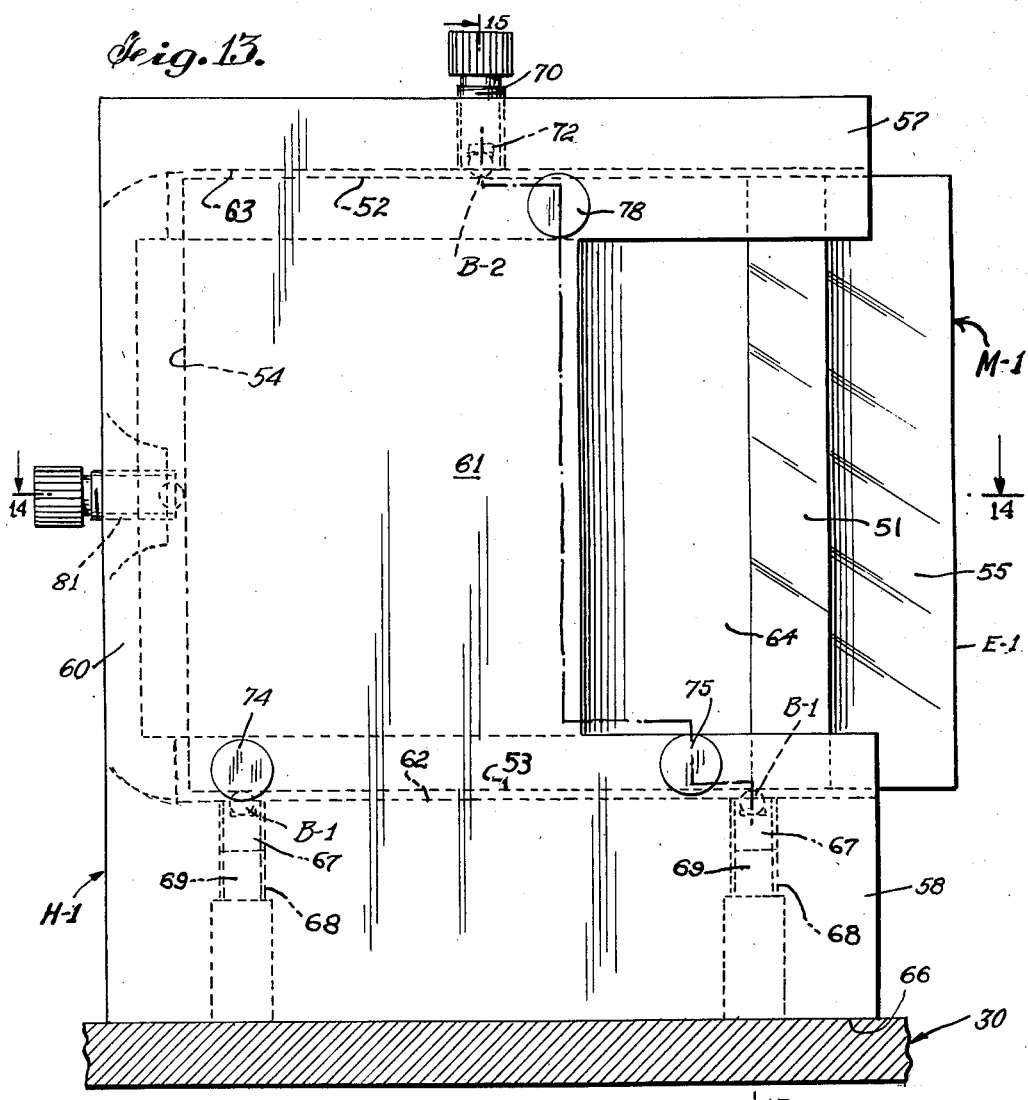
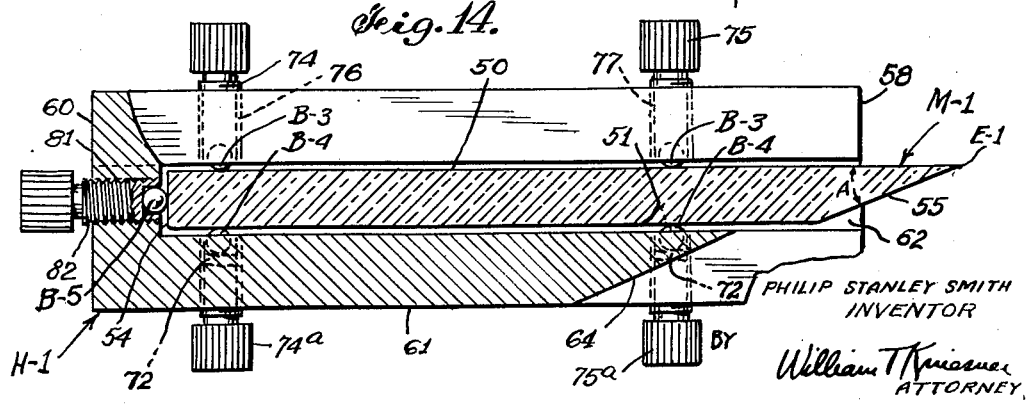

July 28, 1959 P. S. SMITH 2,896,503
MULTI-CAMERA IMAGE-PRODUCTION AND CONTROL
Filed March 8, 1956 10 Sheets-Sheet 6

PHILIP STANLEY SMITH
INVENTOR

BY William T. Kuiame
ATTORNEY

July 28, 1959 P. S. SMITH 2,896,503
MULTI-CAMERA IMAGE-PRODUCTION AND CONTROL
Filed March 8, 1956 10 Sheets-Sheet 7

PHILIP STANLEY SMITH
INVENTOR

BY William T. Knoerner
ATTORNEY

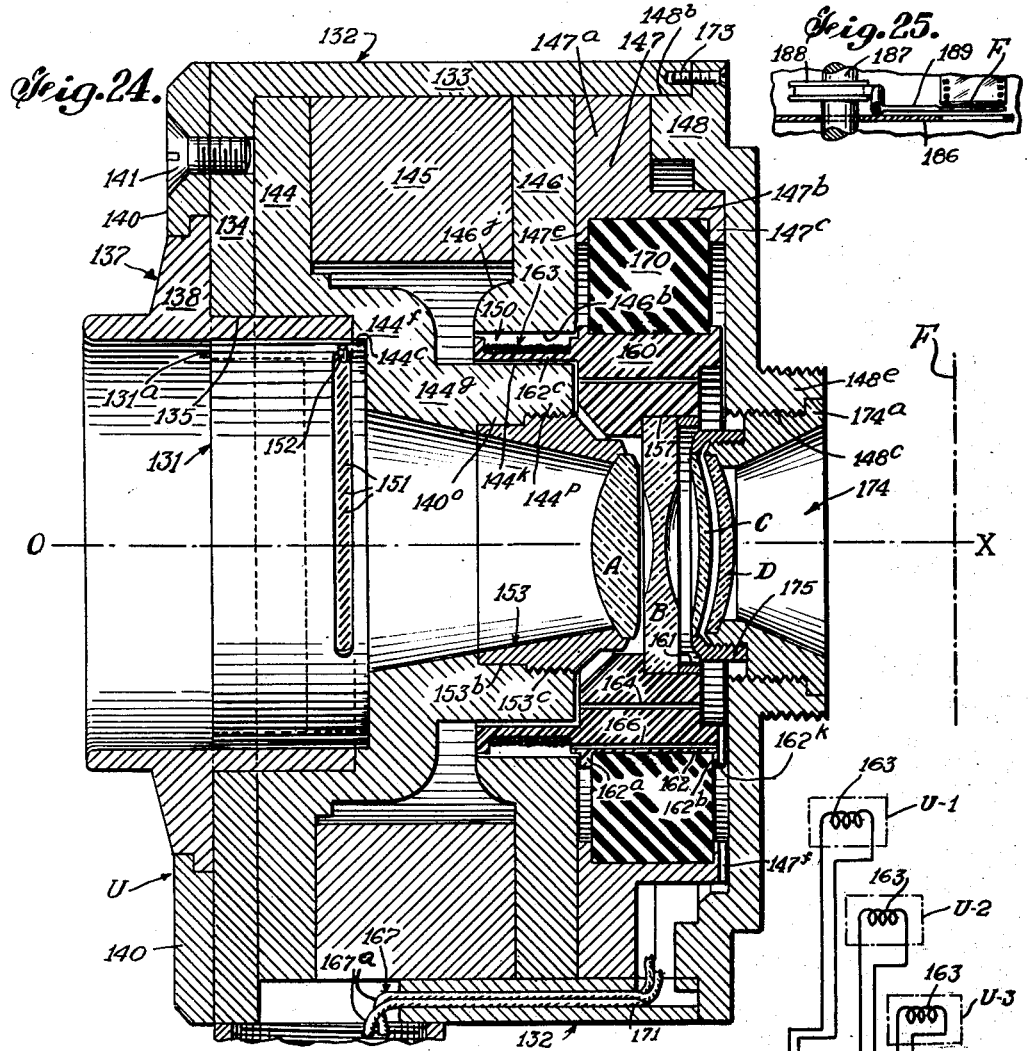

July 28, 1959 P. S. SMITH 2,896,503
MULTI-CAMERA IMAGE-PRODUCTION AND CONTROL
Filed March 8, 1956 10 Sheets-Sheet 9
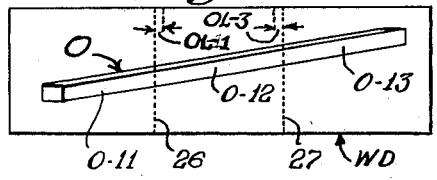
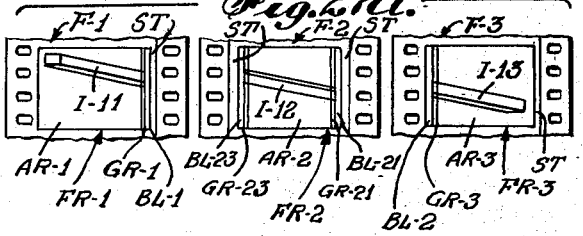
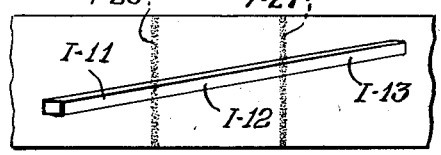
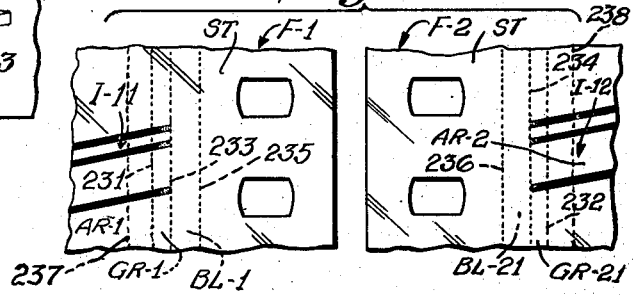
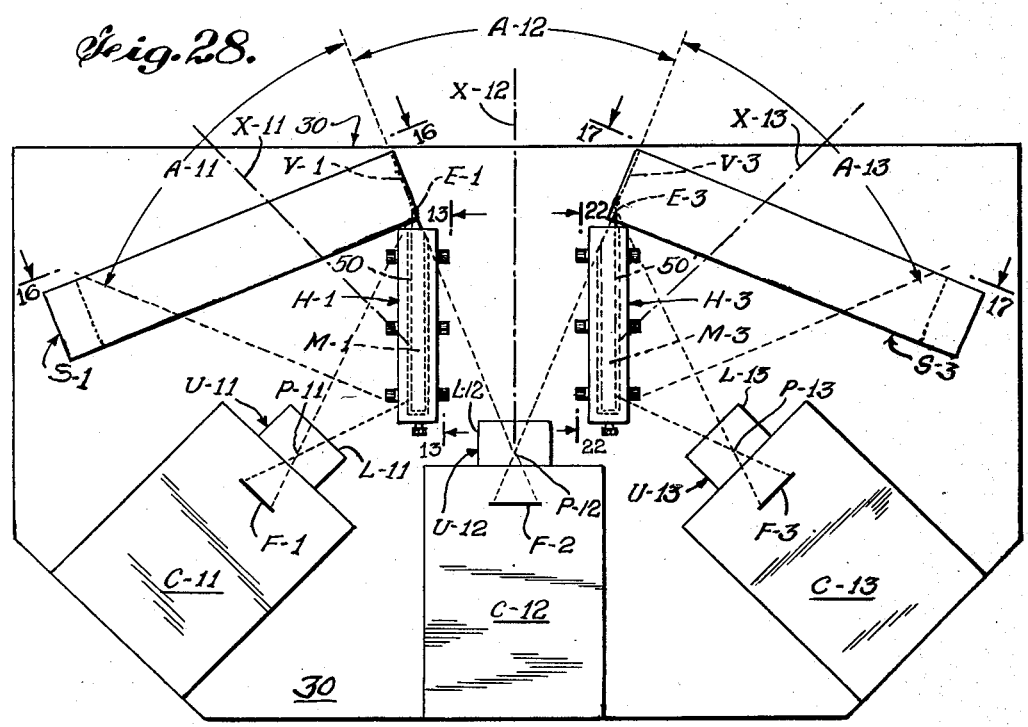
PHILIP STANLEY SMITH
INVENTOR
BY William T. Kriesner
ATTORNEY

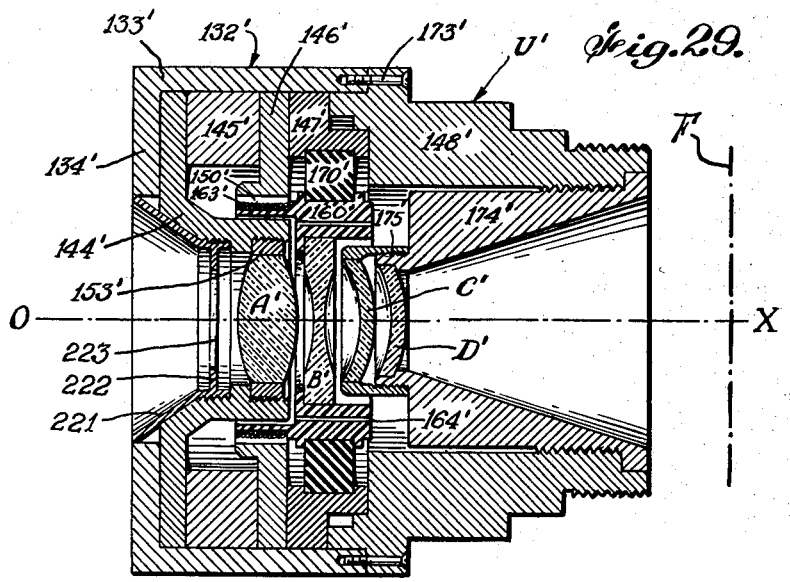
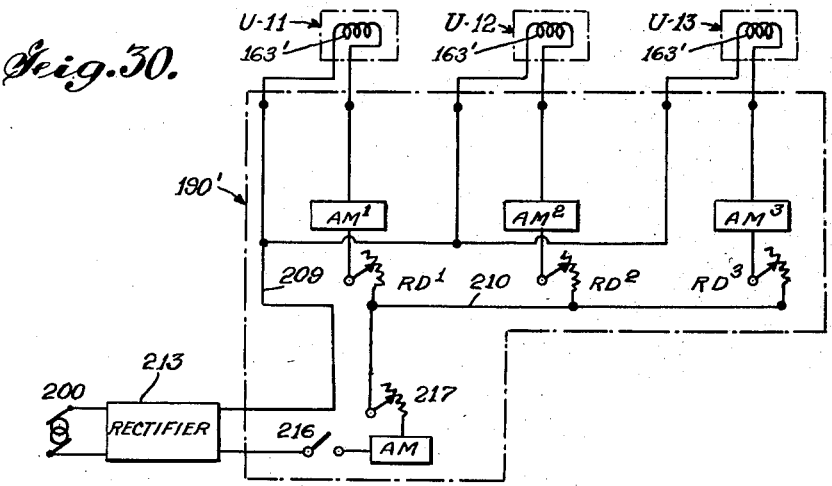

United States Patent Office 2,896,503
Patented July 28, 1959

2,896,503

MULTI-CAMERA IMAGE-PRODUCTION AND CONTROL

Philip Stanley Smith, Camden, N.J., assignor to Smith-Dieterich Corporation, a corporation of New York Application March 8, 1956, Serial No. 570,369

14 Claims. (Cl. 88—16.6)

This invention relates to a method and apparatus for the taking, or recording as on photographic film, of the individual images of adjoining sections or areas of subdivision of a wide-angled scene or field of view with respective lenses or cameras, one for each section, and which individual images are to be combined, by projection, or the like, to form a so-called "mosaic" type of wide-angle scenic or pictorial reproduction, illustratively for motion picture projection by projectors, one for each individual image-bearing film.

Various attempts have heretofore been made to provide a method and apparatus, particularly for wide-screen motion picture projection purposes, for combining, into an attempted whole or so-called "mosaic," film-recorded images of what are intended to be successive sections or sub-divisions of the scene, illustratively, three such images, but such attempts have met with various obstacles and difficulties. Among the latter may be noted mismatching and other defects at adjacent boundaries of the projected images; these are all greatly magnified as in motion picture projection and the junctions or overlaps of the pieces of mosaic are emphasized, with the defects grossly perceptible and greatly detracting from the overall effect sought to be achieved. Because the areas of the scene are "taken" by respective lenses angularly and transversely spaced from one another, the effect is to record corresponding images of the boundary regions that are viewed by the lenses and seen at the image planes thereof from as many different points displaced from one another, with the result that parallax effects are produced, such as displacements of images of the same subject or the same portion of a scene; for example, instead of producing only one image thereof, two relatively displaced images thereof are formed, while on the other hand and depending upon the distance, there is omission, in the boundary regions, of images. Thus there can be duplication or omission in the boundary regions; these defects are of course accentuated when projected, because of the accompanying magnification. By way of further example, there are superimposed further detrimental effects when the focusing of the lenses is changed; with change in focus, the size of the respective fields of view of the lenses changes and fragmentation and relative displacements of the respective images result and thus further gross imperfections and misalignments at the boundary regions result.

Prior camera equipment has entailed costly special complex constructions in which certain of the above defects are sought to be overcome by compacting the several lenses closely together in the endeavor to achieve the effect of having the respective sections of the wide scene viewed from as nearly a single point as is physically possible; this has included restriction to small diameters of lenses employable, together with completely reconstructed film-handling mechanisms, usually crowded together and giving rise to a number of disadvantages. Also there has been restriction to camera lenses of short focal length, which have wide angle characteristics with substantial depth of focus but which nevertheless are characterized by change of size of field of view with change of focus. Also, attempts have been made to cure some of the above defects by special projection apparatus, utilizing complicated oscillating masks and actuating mechanisms therefor, seeking to control the projected light intensities at the overlaps of adjacent projected sections of the scene and thus attempt to obscure the defects. Other efforts to overcome parallax effects suffer from fragmentation or misalignment of images in the boundary regions when changes in focus take place and from the production and recording on one film, in addition to the proper images, of spurious or ghost images such as images of objects in or portions of one section or area of the wide-angle scene intended for production and recording on another film. Other attempts to overcome the above difficulties have also been made. But such expedients have not avoided the serious defects above mentioned and in practice mismatching and fragmentation of image at the match line and effects of parallax such as multiplication or omission remain; for example, present-day practices avoid "close-ups" where the effects of particularly parallax, in duplicating close-up images of the same object, are vividly and sometimes startlingly apparent. There are other defects and deficiencies in prior attempts.

A dominant aim of this invention is to provide an apparatus and method which, in a thoroughly practical manner, overcome such serious defects and deficiencies of prior practices such as those above mentioned and make possible true sectional "taking" or recording and true mosaic reproduction, including true mosaic projection of successive or adjacent sections or areas of the scene or object.

Another object is to provide apparatus that is dependable and reliable in action, of thoroughly practical construction, adapted for economical maintenance and operation, and of simplicity and facility of operation and control, for "taking," in respective sections, the image of a scene or object throughout the desired wide angle of view in a manner to facilitate true mosaic combining of the sections of the image.

Another object is to provide a method and apparatus for coacting optical controls to "take" such sections with such overlaps that, in such mosaic work, registration or matching at the boundaries of the sections can be efficiently and effectively achieved, and, more particularly, so that, with substantial enlargement or magnification, as in wide-screen mosaic motion picture projection, registration of projected section images can be effected with facility, precision and economy and without detrimental distortion or mismatching or parallax-produced image omission, multiplication, or fragmentation at the junctions or transition lines, and free from spurious or ghost images. Another object is to carry out such object with apparatus that is free from undesirable structural restrictions and use limitations of such systems as above mentioned, such as close spacing between lenses or cameras, restriction to special construction throughout, restricted distance between cameras or lenses and the scene or object by which, in prior practices, foreground or closeup image-taking is avoided, and others.

Other objects include the following: to improve in general the "taking" of sectional images of a scene or object for mosaic combining thereof; to provide therefor practical and efficient apparatus of superior and reliable action; to provide a method and apparatus therefor that can also efficiently make use of so-called standard camera or projection equipment, or both; to provide a method and means for avoiding, in known systems of attempted mosaic photography and projection, the various defects thereof and to alleviate or avoid the costliness or inefficiencies thereof; to provide practical, flexible, yet easily operated controls for such apparatus; to provide dependable, practical and efficient apparatus therefor well adapted to eliminate, for practical purposes, mis-match in its various forms, including the effects of parallax, in a manner free from imposition of spurious or ghost images and free from image distortion or fragmentation when change of focus of the several lenses or cameras is effected; to provide dependable and easily controlled focus changes of the several lenses for the taking of such sectional images; to provide easily-operable and practical apparatus therefor that is dependably capable of functioning, free from mismatching and spurious or ghost images and from the effects of parallax, throughout all practical distances from the multiple lens or multiple camera setup as from close-up (such as several feet) to remote distances and including what is usually referred to as infinity; and to provide apparatus therefor adapted to achieve material economies in the production of mosaics.

Another object is to provide apparatus for carrying out such objects as those noted above that is practical in construction, efficient and dependable in action, and well adapted to meet the requirements of practical use in the production, for mosaic projection, of wide-angle motion picture photography.

Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings, in which are shown by way of illustration several of the various possible embodiments of the mechanical features of the invention and in which similar reference characters refer to similar parts throughout, Figure 1 is a top plan view of an assembled multiple-lens or multiple-camera apparatus for taking the respective images of several sections, illustratively three, of a wide-angle scene or object, for subsequent mosaic combining of the several images.

Figure 2 is a rear elevation thereof as seen from the bottom in Figure 1;

Figure 3 is a plan view, in part diagrammatic, as seen substantially along the line 3—3 of Figure 2, with certain parts omitted, others shown in elevation, and others shown in section, in order to indicate more clearly certain optical relationships of various parts;

Figure 4 is an elevation, in part diagrammatic, substantially as seen along the line 3—3 of Figure 2, showing a physical relative disposition of certain of the parts that are omitted in Figure 3 so as to indicate physical assembly thereof to the base plate to achieve the optical relationship of Figure 3;

Figure 5 is a plan view of the base plate, removed therefrom, and showing an illustrative construction and arrangement thereof for assembling the various optically-coacting parts thereto.

Figure 6 is an enlarged fragmentary transverse sectional view of one possible form of means for fastening to the base plate various of the optically-coacting parts of Figure 4, in selected position and relationship relative to one another;

Figure 15:
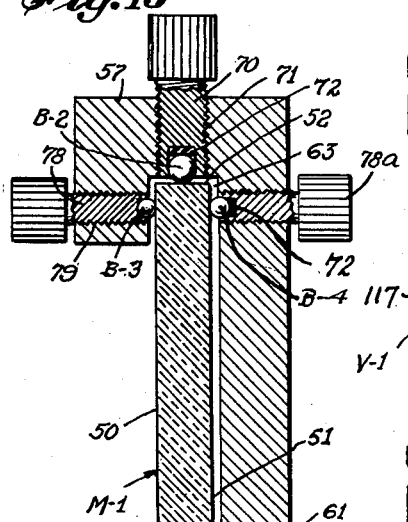

Figure 7 is a representation, also diagrammatic, of a wide-angle scene or object to be taken in three sections, illustratively three substantially equal sections, a left section, center section, and a right section, and for indicating more simply certain optical actions that are achieved, the objects in the scene are represented as a circle, a square, and some diagonal lines, which may be considered as lying in a single plane;

Figure 7a indicates diagrammatically and in part certain of the undesirable optical effects upon the section images of the diagonal lines when, according to prior practices, the lenses of the system are focused in the direction toward infinity;

Figure 7b indicates diagrammatically and in part certain of the undesirable optical effects upon the section images of the diagonal lines when, according to prior practices, the lenses of the system are focused in the direction toward close-up;

Figure 7c indicates diagrammatically and in part certain of the undesirable optical effects upon the section images of the circle and square when, according to prior practices, the lenses of the system are focused in the direction toward infinity;

Figure 7d indicates diagrammatically and in part certain of the undesirable optical effects upon the section images of the circle and square when, according to prior practices, the lenses of the system are focused in the direction toward close-up;

Figure 8 shows in simplified diagrammatic manner the mosaic combining effect, achieved by the invention, of the sectionalized images of the scene of Figure 1, even though the lenses or lens systems are adjusted to the different distances of other objects from the cameras;

Figure 9 is a diagrammatic representation of a wide-angle scene or object to be taken in three sections, indicating objects, respectively as a half-circular and a half-square, on the dividing line or lines for purposes of simplifying explanation, in connection with subsequent figures of the drawings, of phasing of exposures, by the shutters, of the films to the respective object portions divided by the line or lines of division;

Figure 9a is a diagrammatic representation of phased shutters, parts being broken away, indicating relative shutter settings and relative directional drives of the shutters for remedying or alleviating defects at the match-lines caused by cross-moving objects in the scene;

Figure 9b is a diagrammatic representation like that of Figure 9a indicating further advantages achievable in co-ordinating a mirror or mirrors with phasing of shutter exposures relative to the respective portions of a cross-moving object or objects divided at the dividing line or lines;

Figure 10 is a plan view or top elevation, partly diagrammatic and with certain parts broken away or omitted, of pull-down and shutter drive mechanism usable in the cameras of the multi-camera systems, showing mechanism for shifting the phase of film exposure by the shutter;

Figure 11 is a detached vertical sectional view, on an enlarged scale, as seen along the line 11—11 of Figure 10, certain parts being omitted.

Figure 16:
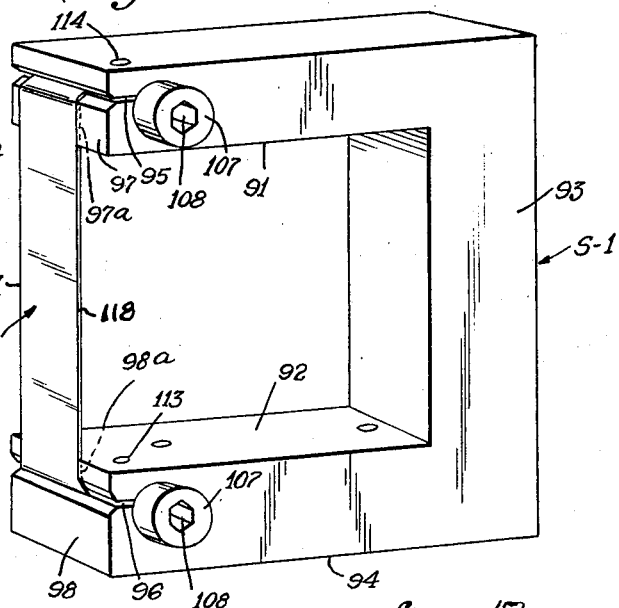
Figure 17:
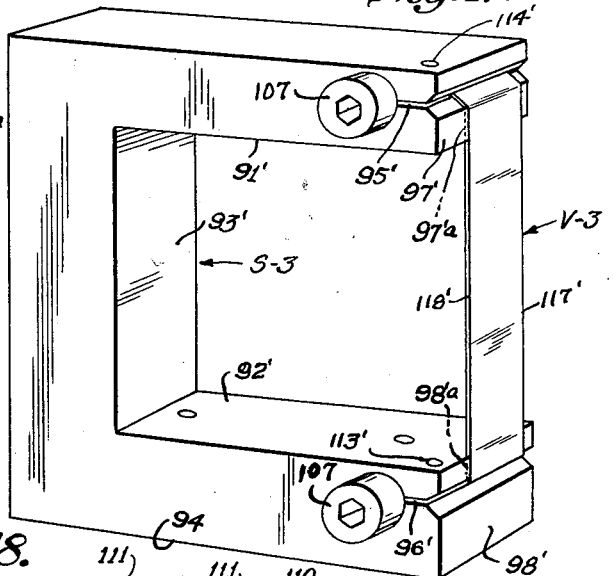
Figure 20:
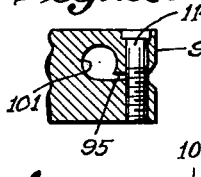
Figures 18, 19:
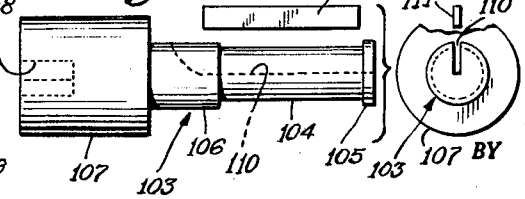
Figure 21:
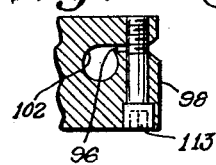
Figure 22:
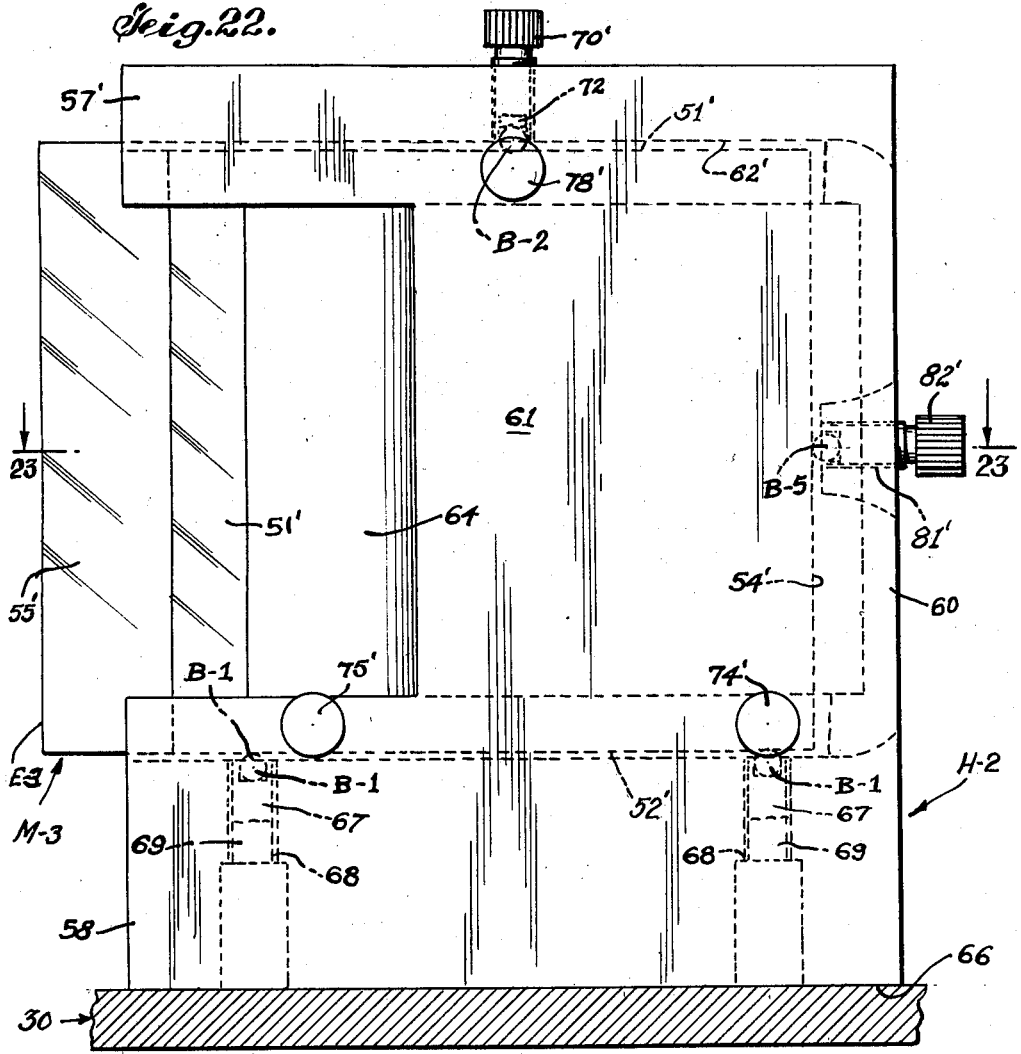
Figure 23:
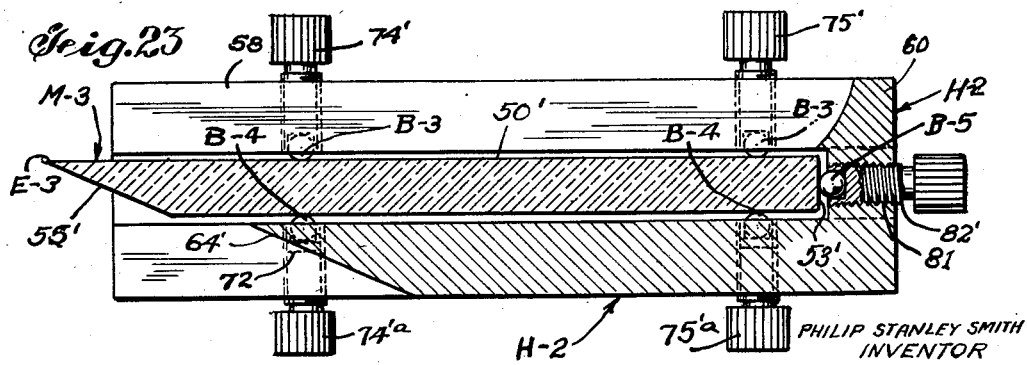

Figure 11a is horizontal sectional view as seen on line 11a—11a of Figure 11 showing an illustrative form of disconnectable driving connection to a main power shaft of the camera;

Figure 12 is a schematic representation of the multiple-camera system and its synchronous electric motor drive utilizing the shutter phasing means of Figures 10–11;

Figure 12a is a schematic representation of the multiple-camera system with a modified form of drive utilizing the shutter-phasing means of Figures 10–11;

Figure 13 is a large-scale view, as seen on line 13—13 of Figure 4, in side elevation of a carrier frame and its optical reflector, certain parts being fragmentarily shown in cross-section and other parts being omitted;

Figure 14 is a horizontal cross-section of the carrier frame and reflector as seen along line 14—14 of Figure 13;

Figure 15 is a vertical sectional view thereof as seen along the line 15—15 in Figure 13;

Figure 16 is a view, in perspective as seen along line 16—16 of Figure 4 and on a smaller scale, of a frame forming a support for a light-ray separator or guide vane;

Figure 17 is a view, in perspective as seen along the line 17—17 of Figure 4 and on a smaller scale, of a frame forming a support for a light-ray separator or guide vane;

Figure 18 shows in enlarged side elevation, the winding drum, and a wedge therefor, of the windlasses associated with the vane-supporting frames of Figures 16 and 17;

Figure 19 is an end elevation thereof as seen from the right in Figure 18;

Figures 20 and 21 are large-scale vertical sectional views of portions of the vane-supporting frame of Figures 16 and 17, showing devices for locking the windlasses of the vane-supporting frames of Figures 16 and 17;

Figure 22 is a large-scale side elevation on line 22—22 of Figure 4, of a carrier frame and its light-ray reflector;

Figure 23 is a horizontal sectional view thereof as seen along the line 23—23 of Figure 22;

Figure 24 is an enlarged central vertical sectional view of a lens-system and control-unit usable in the apparatus of Figures 1, 3 and 4;

Figure 25 is a detached fragmentary view on a larger scale indicating a shutter and step-by-step film advancing mechanism of the cameras of Figures 1, 3 and 4 and of Figure 28;

Figure 26 is a simplified electrical diagram of power supply to and conjoint control of the lens systems of the cameras of Figures 1, 3 and 4;

Figure 27 is a representation, also diagrammatic or schematic, of a wide-angle scene or object having substantial depth, to be "taken" in three sections for mosaic combining;

Figure 27a is a representation of three films indicating schematically and diagrammatically the film recordings of the three object sections of Figure 27, with related film features;

Figure 27b is a representation, also diagrammatic or schematic, of mosaic combining by projection of the film recordings of Figure 27a;

Figure 27c is a detached fragmentary view, on a greatly enlarged scale, of portions of two of the films of Figure 27a;

Figure 28 is an elevation, like that of Figure 4, partly diagrammatic, substantially on line 3—3 of Figure 1, showing a modified physical disposition of parts of the apparatus;

Figure 29 is an enlarged central vertical sectional view of another form of lens-system and control-unit usable in the apparatus as in the arrangement of Figure 28; and Figure 30 is a simplified electrical diagram of power supply to and conjoint control of the lens-systems of the cameras of the apparatus of Figure 28.

Various features of construction are best illustrated and features of action of the apparatus, together with numerous advantages, can be more readily understood when described in connection with multi-camera cinematographic recording on individual film, and subsequent mosaic combining by projection as on a wide screen, of the respective images of sections of a wide-angle scene or object, illustratively three sections, such as a center section or area with adjoining lefthand and righthand sections. The entire field of view may be considered, in vertical section, as generally rectangular (though somewhat curved or concave toward the camera), with the longer dimension of the rectangle, considerably in excess of its height, extending horizontally and this rectangular field, in the illustrative embodiment, for purposes of photographing the entire wide-angle scene by three cameras, is to be divided into the three sections along two vertical lines, the sections being thus right-angled parallelograms all of the same vertical dimension, one for each camera.

In Figure 7, such a wide-angle panorama or scene is indicated diagrammatically by the rectangle W located in a vertical plane at some distance from the cameras and within it are the objects comprising the scene. These objects are diagrammatically shown as comprising a circle 20, a square 21, and two diagonal lines 22 and 23 which meet in apex 24; the lines of these objects are not to be treated as lines in the geometric sense of having no thickness, but may be considered as solid and dimensional or as the edges or outlines of physical objects. The broken lines 26, 27 represent vertical lines of sub-division of the whole scene into left, center, and right object sections O–1, O–2, and O–3, each a right-angled parallelogram, and they are shown as intersecting the several objects 20, 22, 23 and 21 in order that certain effects may be later more clearly described. The subdivision need not be into three equal sections. These object sections are to be recorded on the "frames" of the respective films of three motion-picture cameras, each comprising a lens or lens system of adjustable focus, a film, intermittent film-advancing or pull-down mechanism, timed shutter and a diaphragm. The three cameras may be individual camera structures or they may be consolidated or compacted structurally into a unitary structural entity.

I provide a rigid base 30 (Figure 2) in the form of a relatively thick plate of light-weight metal such as duralumin, making it of appropriate configuration, for example, as shown in Figure 3, on which are mounted and secured the three lenses or lens systems, one for each object section of the scene and hence one for each panel section of the ultimate mosaic, with coacting parts as later described, including appropriate film at the several image planes and appropriate film handling mechanism, all constructed and mounted for ease of assembly, operation, and maintenance, and all hooded over by a suitable hood generally indicated at 31, being preferably made of suitable metal, preferably duralumin, to provide opposed side walls 32 and 33, a back wall 34 (Figure 3) and a top wall 36 (Figures 1 and 2). This hood 31 may be built up in any suitable manner and assembled to the base plate 30, and it may include movable or removable sections (not shown) conveniently located for access to various parts within the hood; the latter can thus serve for mechanical protection of the various optical coacting parts within it and interiorly the walls of the hood and the face of the base plate 30 are made non-light-reflecting by any suitable means, such as by applying to these interior surfaces any appropriate dull non-reflecting finish or coating, or by applying thereto so-called optical black, so that none of these interior surfaces will interfere with light rays emanating from the wide-angle or panoramic scene as they enter the front opening 37 (Figures 3 and 4) provided, in any suitable manner, at the front of the hood. This opening is preferably rectangular and if desired may be made adjustable in any suitable manner, as to its length and breadth, as by suitable slidably mounted non-reflecting panels as indicated at 41 and 42 (Figures 3 and 4).

The underside of the base 30 is provided with any suitable means for supporting or securing the entire assemblage, for stationary or mobile mounting or support thereof and for purposes of illustration I have indicated in Figure 2 a tripod 43 of any suitable construction and provided with any suitable means for securing the base 30 thereto and for permitting, when desired, shifting or adjustability of the entire assemblage relative to the tripod; such shifting or adjustability may comprise any suitable arrangement for rotatively shifting the plate 30 and the apparatus carried by it about a vertical axis, usually the vertical axis of the tripod 43, as for directing the opening 37 toward the scene or action, and it preferably also includes any suitable means for adjusting the assemblage relative to the horizontal plane, as for tilting the assemblage upward or downward toward the scene or action. The upper face of the base plate 30 is preferably plane and on it the several coacting optical devices are mounted, in this embodiment, for orientation and coaction optically one with another.

Thus, light rays coming from the wide-angle scene, such as W of Figure 7, can enter convergingly through the opening 37 and into the interior of the hood wherein the wide-angled field of "vision" is divided into three non-interfering sector-shaped fields of view, by light-ray-controlling and image-forming means about to be described, the fields of view being of respective angles appropriate for the subdivision of the scene into a center section, a right section or area thereof, and a left section, such as the object sections O–1, O–2, and O–3 of Figure 7.

For purposes of illustration but not by way of limitation, these light-ray-controlling means are arranged so that, when considered in plan or in horizontal cross-section, the center field of view subtends an arc of 19° as indicated by the angle A–2 in Figures 3 and 4, and the respective left and right fields of view are each of 25° as indicated by the angles A–1 and A–3. These angles are geometrically adjacent angles and have a common vertex indicated by point P–2 at which their respective axes X–1, X–2, X–3 intersect. They make a total of wide-angle view, from this common point, of 69°. It will be understood that the total wide-angle may be any value other than this illustrative 69° and that the subdivision thereof may be in number and in proportions other than those illustratively mentioned; for symmetry of construction and assembly and action, the left and right angles of view are preferably equal.

I provide three image-receiving planes, being in the illustrative embodiment in the form of film; they are diagrammatically indicated in Figures 3 and 4 at F–1, F–2 and F–3, and for each I provide lenses or a lens system, preferably in the form and with controls as later described, and the three lenses are diagrammatically indicated, in Figures 3 and 4, at L–1, L–2 and L–3. Of these, the image plane or film F–2 and its lens L–2 are located so that the optical axis thereof coincides with the axis X–2 of center angle of view A–2 and the center of the entrance pupil or first nodal point of lens L–2 is at point P–2 which is the common vertex of the several angles of view. The left and right lenses L–1, L–3 and their respective image planes or films F–1, F–3 are substantially displaced respectively to the left and right, as is later described, from the center lens L–2 and its image or film plane F–2. These just-mentioned displacements can be made dimensionally substantial, and in the presently described embodiment may be so considered, thus making it possible to avoid detrimental space limitations and restrictions and whereby I am enabled to utilize the space thus made available for the mounting, setting and control of coacting light-ray-controls about to be described. The lens systems L–1, L–2, and L–3, in this embodiment, I assemble to standard motion picture cameras, usually constructed for handling 35 mm. motion picture film, thus gaining the advantage, where desired, of using such standard motion picture film for recording the images of sections of panoramic views or wide-angle scenes; Figures 3 and 4 show such motion picture cameras C–1, C–2 and C–3, secured in any desired manner to the base plate 30. Mostly such standard cameras are equipped with front turrets each of which can carry detachably a number of lenses or lens systems any of which is selectively associated with the camera aperture by simply moving the turret about its axis, in known manner; the lens systems L–1, L–2, L–3 are identical and are adapted for such turret mounting or, as indicated in the drawings, the turret may be dispensed with and each camera has suitably mounted to it, preferably detachably, its respective lens system.

As shown in Figures 1 and 2, each of these cameras is provided in known manner with two film magazines indicated at R–1, R–2 that contain the take-off and take-on reels for the film; their film drives and pulldowns are interlocked and synchronized, as by electrically interlocked driving motors M, and their shutters are preferably phased, as later described, with respect to complementary object portions that lie to either side of the respective lines of subdivision of the scene. For ease of access to the reels and motors the height of the hood 31 and the location of the top wall 36 thereof are such that the magazines and motors are exposed above the top wall 36 which is cut away or shaped in any suitable manner for that purpose.

The axis X–2 is the optical axis of the lens system L–2 of the center camera C–2 and, with the upper face of the base plate 30 horizontal, this optical axis is also horizontal, being parallel to the face of the base plate 30. The axes X–1 and X–3 of the respective angles of views A–1 and A–3 are also horizontal and intersect the center optical axis X–2, as above noted, at the point P–2 which is the center of the entrance pupil of the lens system L–2 of the center camera; the respective angles or fields of views A–1, A–2, and A–3 may thus be "seen" from a common point and in order that the three views be allocated to the respective cameras C–1, C–2, and C–3, which are laterally displaced from each other as above noted, while maintaining the optical condition that the three cameras view the respective object sections of the scene from the same point, there are provided, among other things, two front-surfaced reflectors or mirrors M–1 and M–3 (Figure 3) respectively positioned with their reflecting surfaces to bend the optical axes X–1 and X–3 of the fields or angles of view A–1 and A–3 into coincidence with the horizontal optical axes respectively of the lens systems L–1 and L–3, the mirrors being constructed at their front ends and being mounted so as to provide three geometrical adjacent angles of view A–1, A–2, and A–3 and so as to provide light-dividing means indicated at E–1 and E–3 in Figures 3 and 4 for distributive control of light coming from the respective intended or desired vertical lines of division, such as lines 26 and 27 of Figure 7, between adjacent object sections of the wide-angle scene as is later described. Coacting with the reflecting mirror surfaces and with the light-dividing means are the respective lens systems L–1, L–2, and L–3 constructed, operating and coactingly controlled so that, when focus of the lens systems is changed to shift the plane of sharpness toward or away from the cameras, there is controlled subdivision, in image-recording on the films, of the object or scene, as at lines 26 and 27, such that the relative geometry of divided object portions remains the same throughout change of focus. Coacting also are light-blocking means and their mountings in relation to the light-dividing means. In order to facilitate understanding of these actions and coactions, it will be helpful first to describe certain of the structural arrangements, mountings and settings of these various coacting parts.

Accordingly, reference may first be made to Figure 4 where the mirrors or reflectors M–1 and M–3, shown in broken lines, are supported in respective holders, generally indicated by the reference characters H–1 and H–3 respectively and where the coacting light-blocking means V–1 and V–3 are shown associated with supports S–1 and S–3 respectively, whereby, as described in greater detail hereinafter, these parts may be mounted and set in relation to each other and in relation to the optical axes of the respective lens systems and their film planes. The reflectors or mirrors and their holders are of identical construction and arrangement excepting that one is built, as it were, left-handed and the other right-handed, the structures therefore being symmetrical to each other. The same is true of the light-blocking means and their respective supports S–1 and S–2 (see Figures 16 and 17). In each case, therefore, it will suffice to describe one in detail.

Considering first the lefthand mirror M–1 and its holder H–1, these parts are shown in greatly enlarged scale in Figures 13–15, in assembled relation. Mirror M–1, which may be of glass plate of substantial thickness, thus facilitating precision of shaping thereof as by grinding and polishing, has, in this illustrative embodiment, a front face 50 in the shape of a right-angled parallelogram and finished, polished or surfaced, in any suitable way, to provide a good reflecting surface that is plane or flat; it is the reflecting surface 50 that is in the path of light rays coming from the left object section O–1 (Figure 7) in the field or angle of view A–1 (see Figures 3 and 4) and, as later described, mirror M–1 is shaped to provide other parts that optically coact with the two adjacent fields of view A–1 and A–2 and their respective lens systems L–1 and L–2 and film planes.

Mirror M–1 has a back face 51 which is plane and flat and preferably parallel to the front face 50 in order to gain the advantages of uniform thickness throughout the area in which the back face 51, which is shorter in horizontal dimension than the reflecting face 50, overlies the latter (see Figure 14).

Mirror M–1 has upper and lower plane edge faces 52 and 53 which are parallel to each other and extend at right angles to the reflecting face 50 (see Figure 15) and it has a dead-end flat or plane vertical edge face 54 (Figures 13 and 14). Opposite the dead-end face 54, the mirror is truncated (see Figure 14) along a vertical plane by way of a vertical face 55 that intersects the reflecting face 50 at an acute angle A that is optically related, as later described, to the adjacent fields of view A–1 and A–2, and that forms at the intersection of the two faces 55 and 50 a sharp vertical straight-line knife-edge E–1 that forms the forward vertical boundary of the mirror; edge E–1 is sharply defined geometrically, as is indicated in Figure 14, for light-dividing and other purposes later described.

As above noted, the optical axes of the lens systems L–1, L–2, and L–3 of the three cameras (Figures 3 and 4) fall in a horizontal plane parallel to the upper face of the base plate 30; mirror M–1 is to be supported so that its reflecting face 50 is vertical and its sharp leading edge E–1 are vertical, that is, at right angles to the upper face of the base plate 30. The holder H–1 for the mirror M–1 comprises a somewhat C-shaped frame, preferably made of the same material, such as Duralumin, as that of the base plate 30; it has two vertically spaced parallel arms 57 and 58 (Figures 13 and 15) integrally and rigidly joined together at one end by a strong vertical part 60, at the left in Figures 13 and 14, and by a side wall 61 that is also integral with the end vertical part 60, forming therewith an angle cross section (Figure 14) that is strong and rigid.

In the upper face of the lower part 58 is formed a horizontal right-angled groove 62 and facing toward the latter and formed in the upper horizontal arm 57 is a companion similarly shaped groove 63, both, in this embodiment, of greater width than the thickness of the mirror M–1 (Figures 14 and 15) and of a depth to receive therein appropriate marginal portions of the mirror M–1 along its respective upper and lower edge faces 52 and 53 (Figures 13 and 15). Mirror M–1 may thus be entered into the holder H–1 by sliding it into these juxtaposed upper and lower grooves 63 and 62, from the right end of holder H–1 (Figure 13) and with the back face 51 of the mirror facing toward the vertical side wall 61 (Figures 13 and 14), the latter being fore-shortened and truncated as at 64 along a vertical plane to terminate the side wall 61 in an acute angle—like the angle A—in which the bevelled edge face 55 of the mirror M–1 truncates the latter.

The base part 58 of holder H–1 has a flat bottom face 66 (Figure 15) to rest flat-wise against the base plate 30 and thus substantially align the grooves 52 and 53 parallel to the base plate face and with their median vertical plane at right angles to the base plate; suitable means, later described, are provided for securing the holder H–1, preferably adjustably, to base plate 30 in a position indicated in Figures 3 and 4. Mirror M–1 is held so that its reflecting face 50 is at right angles to the face of base plate 30 and falls on a line which extends at right angles to a base line joining the centers of the entrance pupils P–1 and P–2 of the lens systems of cameras C–1 and C–2, with the sharp vertical edge E–1 of the mirror located where that right-angle line intersects the left line of the center angle of view A–2. With this optical geometry, there is formed an isosceles triangle whose apex is at E–1 (see Figure 3) and whose base is the line joining the entrance pupils P–1 and P–2 and, where the center angle of view A–2 is 19° and the left angle of view A–1 is to be 25°, the vertex angle of this triangle is 48° and the right-angle line on which falls the plane of the mirror face 50 is the "altitude" of the triangle and that is, of course, the bisector of the vertex angle. In this manner the angle of truncating of the mirror by the bevelled edge face 55, as at angle A in Figure 14, is determined, for the plane of the face 55 is to fall in the right side of the triangle which makes an angle of 24° with the bisector of the vertex angle. In the illustrative embodiment, therefore, the angle A in Figure 14 is 24°.

To achieve precision of setting of the sharp pointed vertical edge E–1, the sharp-angled face 55, and the reflecting face 50 relative to the above described optical geometry of the two adjacent fields of view A–1 and A–2 and their respective lens systems and image planes, with also minimum disturbance from the mirror-holding stresses while avoiding or alleviating detrimental dimensional change or strain due to temperature changes, it is preferred to mount the mirror M–1 in the holder H–1 according to the principles illustrated in a preferred form of mechanisms or devices about to be described. It is preferred to provide bottom support for the plate mirror M–1 at preferably two well-spaced locations along the bottom edge face 53 thereof (Figures 13 and 15); these supports may be made virtual point-contacting supports, each in the form of a hardened steel ball B–1 and spaced about as shown in Figure 13 and adapted to be independently fixed in position, illustratively in the manner shown in the lower part of Figure 15. Thus the ball may be carried coaxially at the free end of a headless screw 67, being set into a recess therein as shown, either fixed, or rotatively, the other end of the screw having a suitably shaped wrench-receiving recess so that it may be threaded into position to project the ball B–1 from the bottom of groove 62 to the desired extent, the bottom part 58 of the holder being provided with a counter-bored threaded hole 68 for that purpose. The balls B–1 thus provide two longitudinally spaced supports for the mirror M–1 and by appropriate adjustment of the respective screws 67, effective to rotatively shift mirror M–1 in its own plane in either clockwise or counterclockwise direction, the respective vertical positions of the two spaced balls B–1 are fixed so that the leading sharp edge E–1 of the mirror is, when viewed as in Figure 13, brought into right-angled relation to the face of the base plate 30; it thus lies in the vertical plane at right angles to the plane of the sheet bearing Figure 13.

Coacting with the spaced ball supports B–1, B–1, just described, and engaging the upper edge face 52 of mirror M–1, is a ball B–2 arranged to apply a yielding downward pressure upon the mirror M–1 and thus hold it in aligning engagement with bottom ball supports B–1, B–1. Ball B–2 is mounted coaxially in a relatively deep recess in the free end of a knurled-headed screw 70 that is threaded into a threaded hole provided in the upper holder arm 57 so as to project the screw, upon turning it, in a direction toward or away from the bottom groove 62. Ball B–2 is movable axially in the screw recess in the bottom of which is seated a suitable resilient means which preferably takes the form of a cushion 72 made of rubber, leather, or other suitable elastomer or a spring, so that the cushion can yield under the setting of the handscrew 70 and maintain a yielding force upon the ball B–2 and thereby cause the latter to hold the mirror M–1 downwardly against the spaced bottom ball supports B-1, B-1, without detrimentally straining the mirror. Thumb screw 70 fits into its threaded hole 71 with a friction fit so that, aided by the reaction of the cushioning member 72, it dependably remains in set position; the screws 67 coacting with the bottom groove 62 are each preferably locked in set position by any suitable means such as a lock-screw 69 (Figure 15) threaded into the threaded hole 68 into abutting relation to the ball carrying screw 67.

Preferably, provision is made for setting the mirror M-1 so that its reflecting face 50 is accurately at right angles to the upper face of the base plate 30 and therefore at right angles to the common plane of the view axes X-1, X-2 and X-3. At two spaced points along the side wall of the bottom groove 62 and toward which the reflecting face 50 of the mirror faces where the latter enters the groove 60, there are provided mirror-engaging balls B-3, B-3 (Figures 13, 14 and 15) mounted in suitable recesses in the free ends of thumbscrews 74 and 75 threaded, with a suitably tight friction fit, into threaded holes 76 and 77 in that side wall of the lower groove 62. By means of a ball B-3, similarly mounted at the free end of a similarly constructed thumbscrew 78 threaded into a threaded hole 79 in the corresponding side wall of upper groove 63, that is, the one adjacent to the reflecting face 50 of the mirror, a third point of contact with the reflecting face 50 is provided, being positioned (Figure 14) about midway of the vertical planes through the lower balls B-3, B-3, which engage the reflecting face 50 at the lower groove 62. Accordingly, by setting thumbscrews 74, 75 and 78 in relation to one another, the three points at which the respective contact balls thereof engage the plane reflecting face 50 can be set so that they, and hence the face 50 itself, fall in a vertical plane that is at right angles to the plane of the base plate 30 and thereby also the sharp front edge E-1 of the mirror M-1 is brought into a right angle to the plane of the base 30 in a direction or plane transverse to the plane in which the line or pointed edge E-1 is set by the above described setting of the bottom edge supporting balls B-1, B-1. This sharp vertical edge E-1 is thus set with precision to be at right angles, in all planes or directions, to the base plate 30, a setting which is desirable in view also of the later-described capacity of the assembly as seen in Figures 3 and 4 to achieve relative pivoting of parts, including pivoting of the mirror itself about the edge E-1 which, for certain of those purposes, can serve as a vertical axis of pivoting.

Juxtaposed to the three thumbscrews 74, 75 and 78 are companion thumbscrews 74ª, 75ª, and 78ª, respectively, threaded into appropriately located holes in the opposite side walls of the slots 62 and 63, carrying, at their respective free ends and set in appropriate recesses with a rubber cushion 72 at the bottom of each, the mirror-contacting balls B-4, the construction and arrangement being like that described in connection with thumbscrew 70 of Figure 15.

Thumbscrews 74ª, 75ª, and 78ª, which fit their threaded holes with a suitable friction fit to hold them in set position, can thus maintain a yielding pressure, at three widely distributed points, upon the mirror M-1 and thus dependably hold it against the rigidly positioned and respectively juxtaposed and similarly distributed fixed contact balls B-3 which engage the reflecting face 50. This arrangement of devices thus achieves facility of initial setting of the mirror M-1 and dependable maintenance of that setting even though the several interrelated parts partake of possible temperature-responsive dimensional changes, all without risk of detrimentally straining or warping the mirror.

In the vertical part 60 of the holder H-1 (see Figures 13 and 14) and at about the mid-point thereof is provided a threaded hole 81 that receives a thumbscrew 82 which carries a hardened contact ball B-5 at its free end for engaging at about mid-point, the dead-end vertical face 54 of mirror M-1; screw 82 fits into hole 81 with a suitable holding friction fit. By screw 82, the mirror M-1, after setting it as above described, may be shifted in horizontal direction, to the right in Figures 13 and 14, that is, along the set bottom supports B-1, B-1 and parallel to the set plane of mirror contact by the three balls B-3. That would be shift of mirror M-1 in general upward direction as viewed in Figures 3 and 4 to provide a component of movement to locate the sharp vertical edge E-1 at the apex of the intended isosceles triangle above described, after the holder H-1 has been secured to the base plate 30 in about the relationship indicated in Figure 4. In so setting the vertical knife edge E-1, the truncated or bevelled face 55 of the mirror M-1 is also brought into alignment with the left line or vertical plane of the center angle of view A-2 and the reflecting surface 50 brought into the vertical plane of the bisector of the vertex angle of the isosceles triangle; this may require rotational shift of the mirror about the sharp vertical edge E-1, a shift that can be effected with precision and nicety by relatively shifting the three balls B-3 that contact the reflecting face 50 and correspondingly readjust the vertical plane through the three points of contact. Such rotational shift may be correlated with shift of the mirror in its own plane by screw 82 and ball B-5, and viceversa.

As above noted with reference to Figures 3 and 4, the light-blocking means V-1, carried by support S-1, coacts optically with various optical elements related to the two fields of view A-1 and A-2; it comprises a very thin vertical vane, preferably with parallel side edges, and it is to be optically and geometrically related to the sharp vertical edge E-1 and to the bevelled face 55 of mirror M-1. It is to be aligned with the vertical edge E-1 with a portion of it extending forwardly thereof and with another portion of it aligned against the bevelled edge 55, falling virtually in the same vertical plane, a vertical plane along the left line of the center angle of view A-2 and along the coinciding right line of the left angle of view A-1. Vane V-1 is opaque and its surfaces are made non-reflecting in any suitable manner, as illustratively indicated above with respect to other parts. Because it is made as thin as possible, on the order of 0.002 inch, it is preferably made of sheet metal, preferably sheet metal of good tensile strength such as hardened and tempered sheet metal, hard Phosphor bronze, or the like, and in Figure 16 the vane V-1 is shown, in somewhat exaggerated thickness, assembled to its support S-1 of which the structural and other coacting features are shown in Figure 16 and also in Figures 18-21.

The support S-1 comprises a C-shaped frame or yolk having parallel upper and lower horizontal cantilever arms 91 and 92 integrally joined at one end by a vertical part 93; the frame is preferably made of the same material, such as Duralumin, as that of the base plate 30 and of the mirror holder H-1. The under face 94 of bottom part 92 is plane or flat to rest flatwise against the face of the base plate 30, and it is with respect to that bottom face 93 that the vane V-1, by the structural features about to be described, is mounted and held with its plane and its parallel side edges extending at right angles to the bottom face 94.

The free ends, being the left-hand ends as seen in Figure 16, of the cantilever arms 91 and 92 are provided with horizontal slots 95 and 96 which open into the end faces 97 and 98 and which terminate, internally, in parallel horizontal bores 101 and 102, respectively, as is better shown in Figures 20 and 21, the bores and their respective slots being located so that slot 95 enters bore 101 (Figure 20) tangentially at the under side of the bore and slot 96 enters bore 102 tangentially at the upper side of bore 102. These slots 95, 96 are of a width materially greater than the thickness of the vane V-1 so that the latter, in the form of a web of suitable length, may have its end portions, as later described, freely entered into the slots from side ends of the latter. Illustratively, the width of the web of sheet metal forming the vane V-1 may be on the order of two inches.

The extreme ends of the web of sheet metal are each received upon a small-diametered windlass or drum, one for each of the bores 101 and 102, so that the ends of the web of the vane V-1 may be wound thereon and thus draw and tension the vertically suspended intermediate web and then anchored or fixed to maintain the web taut and the vane V-1, though of exceedingly thin material, held in a flat plane.

These windlasses or drums are preferably of identical construction and hence only one need be shown or described in detail; it is shown in larger scale in Figures 18 and 19. It comprises a shaft-like part 103 of a length equal to the width of the horizontal arms 91, 92 and of a diameter to be neatly received in the bores 101, 102, being turned down to a lesser diameter intermediate its ends to form the web-receiving drum 104 with a short bearing portion 105 at one end and a long bearing portion 106 at the other end, the bearing part 106 terminating in a larger-diametered head 107 provided at its end face with a wrench-receiving recess 108 so that it may be forcibly turned.

Extending radially and lengthwise of the part 103 so as to traverse lengthwise the drum portion 104 is a slot 110 in which is received the extreme end portion of the sheet metal web together with a wedge-like key 111 to anchor that web end to the drum.

With the two ends of the vane web thus secured to the upper and lower drums, the latter are inserted endwise into the upper and lower bores 101 and 102, with the adjacent loose portions of the web entering the upper and lower slots 95 and 96 sidewise, the heads 107 limiting the endwise entry of the drums into their respective bores and thereby also aligning the respective ends of the two drums and the web portions that extend therefrom with aligned upper and lower slots 97ª and 98ª formed, to provide locating guides for the side edges of the vane web V-1, in those portions of the end faces 97 and 98 across which the web is to be tensioned.

In so assembling these parts, the end heads 107 of the drums may be manually turned to more or less equally divide between them excess length or slack in the web, the lower drum being turned clockwise in Figure 16 and the upper drum being turned counterclockwise; one of them, such as the lower one, may now be anchored or fixed against rotation as by clamping it at the relatively long bearing portion 106 (Figure 18) and this may be done by a clamping screw 113 (Figures 16 and 21) positioned closely adjacent the bearing part 106 and arranged as shown in Figure 21 to strain the adjacent portions of the slotted end of the bottom part 94 into gripping relation to the bearing part 106 of the drum. Thereupon, with the aid of a wrench, the upper drum is turned to tension and draws the vane V-1 taut, the upper drum being turned in counterclockwise direction and locked against rotation by tightening up a screw 114 (Figures 16 and 20) located adjacent the wide bearing portion 106 and arranged as shown in Figure 21 to strain the slotted parts of the upper arm 91 into secure frictional gripping of the drum shaft against rotation.

Turning now to Figure 4, the support S-1 (Figure 16) with the vane V-1 is set onto the base plate 30, with its bottom face 94 engaging the upper face of the base plate and thereby positioning the vane V-1 and its parallel side edges 117 and 118 at right angles to the base plate; the support S-1 is located, substantially as indicated in Figure 4, with the plane of vane V-1 aligned with the angled vertical face 55 of mirror M-1 and with the vertical edge 117 of the vane coincident with the apex of the angle which the face 55 makes with the back face 51 of the mirror; since the vane V-1 is so thin, its plane virtually coincides with the angled face 55 and the vertical sharp front edge E-1 of the mirror is virtually coincident with the plane of the vane; the latter extends toward the front, and hence toward the scene or panorama, along the line or vertical plane between the two adjacent fields of view A-1 and A-2, for a substantial distance, as and for purposes later described. It will thus be seen that the vane V-1, as is better indicated in the vertical projection in Figure 3, has a portion of it coinciding with the right side of the above-mentioned isosceles triangle and a forward portion thereof falling in an extension, beyond the apex at E-1, of that side of the triangle.

With vane V-1 so located, the C-shaped support S-1 extends leftward, in Figures 3 and 4, across the left angle of view A-1 and in the general direction transversely of the axis X-1 of the latter. The vertical spacing between the horizontal arms 91 and 92 of the support S-1 and, because of the length of these arms (see Figure 16), the spacing between the vertical part 93 from the vane V-1, are such that these parts of the support S-1 are outside of the pencil of converging light rays that come from the left object section O-1 (Figure 7) to the mirror face 50, such pencil of rays passing freely through the open square or quadrangle formed by the support S-1 and vane V-1 (see Figure 16). Moreover the surfaces of the support S-1 and the parts carried thereby, including as above noted vane V-1, are made non-reflecting in any suitable manner as by coating them with any suitable non-reflecting material such as optical black or the like, so as to avoid interference with the pencil of light rays by stray light reflections.

As for the other two adjacent angles of view A-2 and A-3 and the cameras C-2 and C-3, they have related to them, as above noted, the mirror M-3 and the vane V-3. In Figures 22 and 23 are shown the mirror M-3 and its holder H-3 and the symmetry of construction thereof to mirror M-1 and its holder H-1 appears clearly by comparison of Figures 22 and 23 with Figures 13 and 14, the latter, as earlier noted herein, being constructed lefthanded and the former being constructed righthanded. Because of such symmetry of construction, the several parts of holder H-3 and mirror M-3 are identified in Figures 22 and 23 by the same reference characters but primed, excepting for the sharp vertical edge of mirror M-3 which is given the reference character E-3.

Accordingly, referring now to Figures 3 and 4, the reflecting face 50' of mirror M-3 is positioned so that it falls on a line which is at right angles to a line joining the entrance pupils P-1 and P-3 of the lens systems of cameras C-2 and C-3, wth the sharp vertical edge E-3 of mirror M-3 located where that right-angle line intersects the right-line of the center angle of view A-2, it being noted that, with desired equality of angular spacing of optical axes X-1 and X-3, from optical axis X-2, the spacing between entrance pupils P-1 and P-2 is the same as the spacing between entrance pupils P-2 and P-3 so that the isosceles triangle having its apex at E-3 (Figure 3) and whose base is the line joining the entrance pupils P-2 and P-3 is the same as the earlier above-described isosceles triangle formed by the points E-1, P-1, and P-2. Relative to this equal isosceles triangle, mirror M-3 has its reflecting face 50' coincident with the bisector of the vertex angle and its bevelled or truncating face 55', which makes an angle of 24° with the reflecting face 50', falls in the left side of that isosceles triangle and hence falls in the vertical plane which is the common boundary between the two angles of view A-2 and A-3.

Vane V-3 is related to this boundary plane and to the truncating face 55' of mirror M-3; a portion of it overlies and is virtually coincident with the bevelled face 55' and a forward portion of it extends beyond the sharp vertical edge E-3. Vane V-3 and it parallel edges 117' and 118' extend at right angles to base plate 30, with vertical edge 117' at the apex of the angle between mirror faces 51' and 55', by the vane support S-3 which is shown in Figure 17, being, as above noted, of construction similar to that of support S-1 except that the latter is built lefthand and the former is built righthand; accordingly, in Figure 17, the same reference characters but primed are applied to similar parts except that the vane is distinguished by the reference character V-3.

The above-described optical and geometric relationship of the mirror M-1, with its several parts, and of the vane V-1, to the two angles of view A-1 and A-2 and to the cameras C-1 and C-2 is feasible, for purposes of achieving reasonably precise or true and controllable mosaic combining of the images of the two adjacent object sections, such as object sections O-1 and O-2 of Figure 7, because of the coacting characteristics of the lens systems L-1 and L-2, later described in detail, in that the latter maintain a fixed relation between their respective entrance pupils and image or film planes, such as entrance pupil P-1 and film plane F-1 for camera C-1 and entrance pupil P-2 and film plane F-2 for camera C-2, even though the focus of the two lens systems is changed as is necessary with change of distance between the wide angle scene or object and the several cameras. The same is true with respect to the corresponding parts concerned with the center angle of view A-2 and the righthand angle of view A-3 and their respective cameras C-2 and C-3, for achieving similar reasonably precise or true and controllable mosaic combining of the images of object sections O-2 and O-3 of Figure 7. This will be made clear hereinafter.

The geometric arrangement of parts as thus far described is appropriate particularly where, as earlier indicated, the cameras C-1, C-2 and C-3 take the form of standard motion picture cameras, except for the lens systems, such as the known Mitchell type of camera using standard 35 mm. film and having a normal aperture width of 0.868 inch, and where the lens systems L-1, L-2, and L-3, about to be described, are lenses of 50 mm. focal length, the three lens systems being identical. For the just-stated illustrative characteristics, and referring to Figures 3 and 4, the spacing between the centers of entrance pupils P-1 and P-2 and the spacing between entrance pupils P-2 and P-3 is 8.500 inches, and thus the bases of the two equal isosceles triangles above described are dimensionally defined and the three entrance pupils located relative to one another and relative to the apexes at E-1 and E-2 of the two triangles, these apexes falling, as above pointed out, on the respective sides of the center angle of view A-2 which is illustratively 19°.

Preferably, for assembling the respective cameras to the base 30 with the optical axes of their respective lens systems falling in the same horizontal plane parallel to the face of base plate 30, provision is made for adjusting the cameras about vertical axes through the centers of their respective entrance pupils P-1, P-2, and P-3, as by upstanding pivot pins 121, 122 and 123 (see Figures 5) accurately located in and fixed to the base plate 30, each camera base having in its base and in vertical line with its lens entrance pupil a hole for receiving its fixed pivot pin. In the above-described illustrative arrangement of Figures 3 and 4, the angle between the optical axes of the lenses of camera C-1 and C-2 is about 48° as is also the angle between the optical axes of camera C-2 and camera C-3; departures from exactness of this illustrative angularity are according to the later-described control of overlap of the images of adjoining object sections. Remote from the axis of pivoting, each camera structure is provided with means for securing it to the base plate 30 in the desired angular relationship between the respective optical axes of the cameras and such means may comprise suitable slots and clamping screws, illustratively slots in the base plate 30 as indicated in Figure 5 at 124 through which clamping screws, such as the screw 125 of Figure 6, may be passed and threaded into the underside of the base of the part to be clamped to the base plate 30. In setting the cameras about their respective vertical pivot pins, it will now be apparent that the center camera C-2 is preferably initially set and fixed in the desired position, that position being one in which its optical axis forms in effect the center line of the entire composite optical system, and hence the center line of the wide angle scene or object, whereupon the pivotal setting arrangements of cameras C-1 and C-2 may be successively employed to arrive at the ultimate respective angularity of their optical axes to the optical axis of the center camera in relation to the respective overlaps desired.

The lens systems L-1, L-2, and L-3 (Figures 3 and 4), illustratively of 50 mm. focal length, are identical and provision is made, as later described, for effecting simultaneously, in-step and equal shifts of their respective planes of sharpness from a distance very close to the camera assembly, such as three or four feet, to a distance remote from the multiple camera assembly, such as infinity, and in reverse direction. These lens systems are identical and it will suffice to describe one of them in detail.

In this illustrative embodiment, the lens systems L-1, L-2 and L-3 take the unit form shown in Figure 24, which is a greatly enlarged vertical sectional view through the optical axis of any of the lens systems L-1, L-2 and L-3 as seen from the left in Figures 3 and 4, the image or film plane being indicated, in Figure 24, by the vertical line F which may thus be taken to represent any one of the film planes F-1, F-2 or F-3 of Figures 3 and 4. The scene or object section to be photographed or impressed upon the image plane F is thus to the left of Figure 24, and light coming therefrom may be and preferably is controlled by a diaphragm of suitable construction and indicated at 131, its opening being coaxial with the optical axis, indicated at O—X in Figure 24, of the lens elements in this embodiment, comprise lenses A, B, C and D of which lenses C and D are objective lenses and lens B is axially movable relative to lenses A, C and D which are fixed with coactions later described. In the three lens systems of Figures 3 and 4, the lenses B therein are to partake of simultaneous shift in identical increments, whether the movement is toward the left or toward the right as viewed in Figure 24.

There is provided a small-diametered front casing part 132 comprising a cylindrical outer wall 133 and an annular front wall 134, made of non-magnetic material such as brass. Front wall 134 provides a bearing surface 135 for rotatively receiving the sleeve-like flange 136 of an annular diaphragm control member 137 that has a flange 138 external of the front wall 134 against which it is held by an inter-fitting flat ring 140 secured to the front wall by screws 141. Control member 137 may thus be shifted rotatively to vary the size of the opening of the diaphragm, the latter being of the iris type.

Received within the front case 132 and coaxially aligned by the cylindrical wall 133 is a number of parts generally indicated by the reference characters 144, 145, 146, 147 and 148, with the first part 144 resting against the inside of the front wall 134.

Members 144, 145 and 146 form parts of a magnetic circuit that coacts with other parts later described. Of these members, number 145 is in the form of an annular or ring-shaped permanent magnet, preferably made of a material like "Alnico" or "Permalloy," which is capable of being strongly magnetized and of long retaining high intensity of magnetization. Magnetized at high intensity, permanent ring magnet 145 has one of its end faces as the north pole and the other is of opposite pole, namely, south pole. Members 144 and 146 make contact with these end faces and form pole pieces, of the above polarities, for the permanent magnet 145; these pole pieces are of high magnetic permeability being made of soft iron, soft steel, transformer steel or the like, and they are shaped substantially as shown in Figure 24 to terminate in coaxial radially juxtaposed cylindrical faces 144$^k$ and 146$^b$ of very much lesser respective areas than those of the end faces of the ring magnet 145 itself, both being surfaces of revolution and forming therebetween a flux gap 150 of great magnetic density, a gap that is of uniform radial dimension throughout its axial and circumferential extent relative to the common axis O—X of the parts and with which the air gap 150 and the gap-forming surfaces 144$^k$ and 146$^b$ are also coaxial. Thereby the high intensity magnetic flux of the permanent magnet 145 is guided to and further concentrated, in substantially uniform distribution, radially across this small air gap 150.

To further compact the construction and to minimize space requirements, those portions of the pole-piece 146 that are of smallest radius extend into the space within the ring magnet 145, as at 146$^j$, and the portions 144$^b$ and 144$^g$ of the other pole-piece 144 likewise extend into the space within the ring magnet 145, from the other end thereof, with the portion 144$^g$ entering into but spaced from the pole face 146$^b$ of the pole-piece 146.

The pole-piece portion 144$^g$ is internally turned to provide two stepped coaxial surfaces 144$^o$ and 144$^p$, of which the latter is threaded, to receive in respective telescoping and threaded engagement the external cylindrical surface 153$^b$ and threaded part 153$^c$ of a lens mount 153, preferably made of non-magnetic material, carrying at its righthand end the lens A which is thereby mounted coaxially of the axis O—X.

The left end of the annular pole piece part 144$^g$ is internally tapered to mate with the internal taper 153$^a$ of the lens mount 153 and its left end face is shaped or counterbored to form seat 144$^c$ in which is non-rotatably seated and secured the ring support 131$^a$ of the diaphragm structure 131 relative to which the control sleeve 136 of the diaphragm control member 137 is rotatable in order that, through suitable mechanical connections such as a pin and slot connection 152, the vanes or leaves 151 may be shifted, in known manner, to change the diameter of the diaphragm opening in response to rotational shift of the control member 137 at the front wall of the casing.

Lens B has a peripheral portion of larger diameter than the remaining lenses which is fitted into a right-angled seat 157 formed or turned in a ring-shaped carrier 160 which is preferably made of lightweight non-magnetic material, preferably non-metallic, such as any suitable plastic, for example, Bakelite or Bakelite-impregnated fiber. Lens B is seated coaxially in the annular carrier 160 and is held in place as by a retaining ring 161, which may be of brass, press-fitted or otherwise secured in place.

The outer cylindrical surface 162 of the ring-shaped carrier 160 forms a seat for a ring-shaped support 170 that is made of a suitable yielding and preferably resilient material such as rubber or other elastomer, and in relation to the compounding of the latter its cross section or cross sectional shape may vary. Illustratively and as shown in Figure 24, its cross section may be that of a right-angled parallelogram such as a square with its mid-plane substantially coincident with the mid-plane of lens B. It may be secured in place in any suitable manner; in Figure 24 it is shown as confined between two peripheral flanges of the ring carrier 160.

The outer peripheral portion of the rubber ring member 170 is held in concentric relation to the casing part 132 and to the other parts of the assembly by a centering ring structure 147 made of non-magnetic material such as brass and having a ring part 147$^a$ that rates against the pole-piece 146 and a sleeve-like extension 147$^b$, being internally turned to provide a cylindrical surface between end flanges 147$^e$ and 147$^c$ to receive the outer cylindrical surface of the rubber ring support 170.

The ring-shaped lens carrier 160 has an integral coaxial extension in the form of a thin flange or drum 162$^c$ with end flanges 162$^e$ and 162$^b$, all of lesser radial dimension than that of the flux gap 150 into which the extension extends with suitable clearance between it and the respective pole faces 146$^b$ and 144$^k$; on the spool extension 162 is a winding 163 of a suitable number of turns, preferably uniformly distributed in axial direction and also symmetrical with respect to a central transverse plane through the pole faces of the flux gap 150.

The rubber ring support 170 holds the carrier 160 coaxial with the outer centering ring 147 and holds the lens B coaxial with the optical axis O—X, as well as holding the winding 163 coaxially and concentrically with respect to the flux gap 150. This relationship is maintained during axial displacement of the carrier ring 160, with its lens B, as is later described and insures contactless and frictionless axial movement of the winding and its support relative to the juxtaposed pole faces.

The end closure plate 148, forming a back casing part, is preferably made of brass and is rabbeted as at 148$^b$ so that it concentrically interfits with the casing wall 133, being internally stepped to abut against the end faces of the centering ring 147; by screws 173 it is secured to the end of the casing wall 133, in effect clamping the concentrically assembled parts 144, 145, 146 and 147 securely against the front wall 134 of the casing, thus fixing the coaxial relation of all the parts relative to the optical axis A—X.

The back closure plate 148 has a coaxial threaded bore which is 148$^c$ of substantial diameter and of appropriate axial extent, being extended by an annular flange 148$^e$ which is externally threaded as shown. Threaded into the bore 148$^c$ is a ring-like lens mounting member 174 which coaxially carries lens D at its inner end and is flanged at its outer end as at 174$^a$ to abut against the shoulder of an internal rabbet formed in the flange 148$^e$ to axially locate the mounting ring 174 and thereby also locate the two lenses C and D coaxially carried by it in proper spaced relation to lens A and also fix them with their axes coincident with the optical axis O—X. Mounting ring 174, at its inner end, is of reduced diameter where it is externally threaded to receive the threaded mounting ring 175 at the inner end of which the lens C is carried and secured in any suitable way. Lens C is thus mounted coaxially with lens D and the spacing therebetween is fixed by the ring 175 abutting against a suitable shoulder of ring 174, as shown.

By means of threaded end flange 148$^e$ of the back casing part 148, the resultant compact assemblage, which may be termed a lens-and-control unit and for convenience may be designated as a whole by the reference character U, is attachable, as above described, to the camera and since, in the present embodiment of the invention, such units may be identical for cameras viewing adjacent object sections, I have indicated, in Figures 3 and 4, three such units U–1, U–2 and U–3 as attached respectively to the cameras C–1, C–2 and C–3 and embodying therein respectively the above-described lens systems L–1, L–2 and L–3 each comprising lenses A, B, C and D with lens B axially movable by coactions and for purposes about to be described; the above-described pupils P–1, P–2 and P–3 are therefore the respective centers of the entrance pupils or first nodal points of the three identical lens-and-control units so assembled to the three cameras, the respective lenses A, B, C and D being, by the assemblage of the units to the cameras, related to the respective image or film planes F–1, F–2 and F–3 as already described.

The three cameras, as above noted, are provided with respective appropriate film pull-down mechanisms which are driven synchronously, and preferably, as later described, their respective shutters are phased and directionally driven with relation to the respective apertures and with relation to respective object portions divided at lines 26 and 27.

Before describing various coactions of the several lens systems, and their controls, with other parts of the apparatus and system above described, it will be helpful to consider what happens in prior attempts to achieve mosaic combining of images of objects photographed in sections on individual film, and reference may now be made to Figures 7a–7d in which certain heretofore insuperable difficulties and effects of such prior attempts are diagrammatically indicated with respect to a 3-camera set-up by which the above-described wide-angled scene W of Figure 7 is to be filmed in three sections.

Let it be assumed that this wide-angle scene W is located at middle distance from such a 3-camera set-up and that the latter has respective angles of view, with or without inclusion of reflectors or mirrors, such that, when the three lens systems are focussed upon the middle-distance scene W, respective recordings of images of the respective halves of the circle object 20, the square object 21, and the diagonal line objects 22 and 23 take place on the respective films, the halving being along the lines 26 and 27; but ensuing necessary change of focus of the three lens systems or shift of the planes of sharpness to a point other than middle distance results, in effect, in the following:

(a) In each such prior lens system, a change of focus away from middle distance and toward infinity shifts the nucleus of an object point in a direction toward the axis of the optical system, as diagrammatically indicated in Figure 7a with respect to the two diagonal line objects 22 and 23 of Figure 7. Images of the same objects or object portions become smaller in size, and fields of view are larger and each can encompass more of an object or scene. The image of a left portion of line object 22 of Figure 7 is by this change in focus of the left optical system shifted as indicated at 22$^a$ and in the direction of the arrow indicated in Figure 7a and it comprises more than the left half of line 22 of Figure 7; the image of a right portion of object 22 is shifted by the center optical system as indicated at 22$^b$ and in the direction of the arrow shown, a direction which is opposite to the direction of shift of the left portion 22$^a$, the relative displacement being thus compounded; image 22$^b$ comprises more than the right half of object 22. At the intended plane of the division of the scene into the object sections O–1 and O–2 (Figure 7), the respective cameras would "view" or record at their image planes not a single or unitary straight line object 22 as in Figure 7, but rather two separated distinct line images 22$^a$ and 22$^b$ that are dimensionally different from images of the previous focal setting and moreover they are not only out of line but materially displaced from each other. In like manner the line object 23 of Figure 7 is "viewed" or film-recorded not as a single or unitary object but as two images 23$^a$ and 24$^a$ dimensionally different from the images of the previous focal setting and physically displaced from each other in the respective directions of the arrows indicated in Figure 7a. The part 23$^a$ is the image of more than the left half of object 23 and is displaced toward axis of the center camera system and the portion 24$^a$ is the image of more than the right half of object 23, being displaced toward the center of the right-hand camera axis; these image portions are thus no longer true complements to each other nor true components of the object itself. In no case is it possible to match these image portions for mosaic combining. Also the apex 24 of Figure 7 is similarly displaced, that is, toward the axis of that viewing system within the view of which it falls, in this case, the center camera.

(b) If now the focus is changed to a plane of sharpness relatively close to the camera, leaving the scene or object W at middle distance as before, images become larger in size, and fields of view are smaller and each encompasses less of an object or scene with the result that portions of images are lost; the nuclei of object points are shifted, relative to the axis of the lens system and field of view in which they happen to lie, in opposite direction, that is, away from the optical axis, as indicated in Figure 7b. With respect to the respective halves of the line objects 22 and 23 of Figure 7, the parts of each image are lost or cut off at the defining edges of the respective film frames because of the shifts and increase in image size somewhat as indicated, in Figure 7b, at 22$^c$ and 22$^d$ for the respective halves of the object 22 and at 23$^c$ and 23$^d$ for the respective halves of the object 23. These image portions are no longer true complements to each other nor images of true components of the object itself. Also the apex 24 of Figure 7 has been so far displaced that it is outside of the field of view of the center camera.

(c) These two diagrams, Figure 7a and 7b, indicate also how, according to prior attempts, change in focus of the several lens systems is accompanied by such relative shifts, at the respective image planes, of the locations of the respective terminal points in the desired line of division (such as line 26) of the respective halves of the line object, in directions that preclude matching when mosaic combining of the images is attempted.

(d) Upon change in focus of such prior lens systems away from the middle distance and toward infinity, a left portion of circle object 20, because of the shifts of the nuclei of object points described above in connection with Figure 7a, is recorded at the image plane of the left camera as the image of a left portion 20$^a$ of a sort of ellipse that has its major axis horizontal, and the right portion of the object 20 is seen similarly as a right portion 20$^b$ of such an ellipse, as in Figure 7c which diagrammatically indicates such relative displacement of peripheral points of the object 20, and dimensional changes as well as changes in shape; thus, image portion 20$^a$ shows smaller image size and that more than the left half of circle object 20 is encompassed; image 20$^a$ shows smaller image size and that more than the right half of circle object 20 is encompassed. Similar effects cause the square object 21 to become in effect a rectangle with its long axis horizontal, as is indicated diagrammatically in Figure 7c by the respective portions 21$^a$ and 21$^b$ thereof.

(e) When the focus of such three prior lens systems is changed to bring the plane of sharpness relatively close to the camera, with relative shifts of the nuclei of object points in directions as explained above in connection with Figure 7b, the object circle 20 becomes in effect a sort of ellipse with its major axis vertical, made up of the respectively distorted or fragmentary left and right portions 20$^c$ and 20$^d$ as suggested in Figure 7d. Thus, image portion 20$^c$ shows larger image size and that a substantial portion of the left half of circle image is lost or cut off; image 20$^d$ shows increased image size and that a substantial portion of the right half of circle image 20 is lost or cut off. Similarly, the square object 21 becomes in effect a rectangle made up of the respectively distorted or fragmentary portions 21$^c$ and 21$^d$, of Figure 7d, with its major axis vertical.

(f) The defective actions and results above described and intended to be indicated in principle in Figures 7a–7d are present even in such prior proposals that seek to avoid the effects of parallax by the use of mirrors or reflectors related to the respective left and right cameras in the endeavor to produce the optical effect of all three cameras viewing the scene or object from a single point; but such prior proposals are defective also in other respects as is later herein pointed out. In the absence of attempted correction by mirrors of parallax effects, other prior proposals or attempts, aside from having the deficiencies above indicated with respect to Figures 7a–7d, also have superimposed the duplication or omission of images, depending upon the direction in which the focus of the lenses is changed.

(g) In Figures 7a–7d, no attempt has been made to depict other defects and handicaps that occur, in such prior proposals or systems, when it is attempted to "take" image sections and to project films on a wide screen to mosaically combine the image sections; instead, for present purposes, they are simply diagrammatically indicated in Figures 7a–7d by the vertical irregular zigzag lines Z which are intended to include therein all of such various other defects, including the deficiencies caused in projection by oscillating obscuring masks, in contrast with the reasonably precise or true, and, when combined as in projection, visually virtually imperceptible vertical transition bands T–26 and T–27 of Figure 8 substantially devoid of detrimental mis-match effects achieved by the unique coactions in the apparatus and method of this invention, wherefore these transition bands or overlaps are shown in Figure 8 lightly strippled and not in full lines, to indicate their presence; they are described in detail later.

In this latter connection, the three lens systems L–1, L–2 and L–3 of the respective lens units U–1, U–2 and U–3 are constructed and arranged to coact with other parts and elements of the apparatus so that the focusses of the three lens systems may be conjointly changed relative to the wide angle scene or object for sectional image recording on the respective films for focussing upon objects at different distances from the 3-camera unit but without so shifting relative to one another the respective images of the object portions or points that fall on the dividing line, such as line 26 of Figure 7, as will cause unmatchable relative displacements of the respective image portions recorded by the several films, such as relative displacements discussed above in connection with Figures 7a and 7b, and moreover without loss of image portions of objects at or adjacent the intended line of division (such as losses represented by the images 20$^c$ and 20$^d$ of Figure 7d) and without unwanted image additions, to recorded image sections, of objects at or adjacent the intended line of division (such as additions included in the images 20$^a$ and 20$^b$ of Figure 7c). These results I am enabled to gain, with the forms of lens systems herein disclosed, along with the desirable advantage of thereby also maintaining constancy of size of the respective fields of view above described whereby I am also enabled materially to simplify certain structural and functional features.

The three B lenses of the three lens systems L–1, L–2 L–3 of Figures 3 and 4, being each coaxially movable relative to its coacting objective lenses C and D, are caused to be simultaneously shifted for change of focus, or to partake of synchronous movements that are in magnitude and direction identical, by controllably energizing the three windings 163 of the three units U–1, U–2 and U–3 with alternating (or pulsating), or unidirectional current, or both, the winding 163 in each case producing a magnetic field which reacts with the high-intensity magnetic field or concentrated flux across the air gap 150 to effect physical axial displacement of the ring carrier 160 with its lens B in coaction with the yielding and elastic characteristics of the rubber mounting ring 170 which illustratively may be compounded to have a durometer value on the order of 50. The rubber ring support 170 is yieldable in axial direction, substantially uniformly throughout its annular cross section. It maintains coaxiality of the moving lens B with the optical axis O—X (Figure 24) of the lens system, due to its uniform distortability axially between its peripheral portion that is fixed by the centering ring 147 and its inner annular portion where it is secured to the ring carrier 160; it is aided by the powerful coaction between the winding 163 and the high-intensity permanent magnet flux gap 150 in maintaining coaxial relationships as through the winding 163 and its spool in effect float in the annular flux gap 150. Lens B, in shifting its position or in moving axially, coacts with the companion lenses A, C and D to change the focus of the lens system while maintaining constancy of size, at the image or film plane, of in-focus and out-of-focus images of the scene or object as well as registry thereof, as is later further described; in an illustrative embodiment of these lenses, the range of position shift or the length of the stroke of movement of movable lens B relative to lenses A, C and D is about 0.012 inch, for shifting the focus or plane of sharpness of the lens system from a point very near the camera to a point very remote or at infinity.

For example, consider locating the above described flat or plane scene or object W of Figure 7 at a middle distance from the three coacting cameras C–1, C–2 and C–3, which, illustratively as in Figures 3 and 4, are aimed or directed at respectively adjacent sections of the scene, such as object sections O–1, O–2 and O–3; at about the mid-point of the synchronous shift or movement of the lenses B of the three lens systems, the respective aligned planes of sharpness of the lens systems coincide with the respective aligned planes of the objects in the respective object sections of the scene and the three cameras are focussed upon the latter; accordingly, there appear at the respective image planes or are recorded on the films F–1, F–2 and F–3 matchable image sections to form images I–1, I–2 and I–3 as shown in Figure 8, but for all other focus settings and hence for all other portions in the range of movement of the three B lenses, these respective object sections will be out of focus and the respective planes of sharpness will be either in front of the scene W or in the back of the latter according to the direction of the shift or movement. In the latter case, the corresponding images recorded on the films F–1, F–2 and F–3 of the respective object sections O–1, O–2 and O–3 as divided by the repective angles of view will be out of focus but remain of the same size as and are registered with the in-focus images. There is no relative directional mismatching displacement between adjacent image portions divided by a dividing line as recorded at the image planes or film planes F–1, F–2 and F–3; the coacting or synchronized corrective actions of the shifted lenses so affects the respective fields of view that no adjacent portions of the image sections pass out of the fields or are added to each other. For example, referring against to Figure 8, throughout change of focus, the left camera C–1 records on a film frame a large number of in-focus and out-of-focus images of the left part of the circle object 20 (Figure 7) as shown in Figure 8 to the left of the vertical transition band T–26, all of these images of this part of the object being of the same size and superimposed upon each other and registering to form a single and relatively sharp image, while the center camera C–2 simultaneously records on a frame of its film F–2 a large number of in-focus and out-of-focus images of the right part of the circle object 20 (Figure 7) as shown in Figure 8 to the right of the transition band T–26, all of these images of the right hand part of the circle object being of the same size and superimposed upon one another and registered to form a single relatively sharp image. As between the two adjacent sections, relative sizes and positions of the two adjacent images are maintained the same, particularly at the dividing line. Though change of focus is from a point near the camera to a point infinitely remote, object points of the same object on the dividing line are not displaced or shifted relative to one another, and on the respective films they retain, relative to each other, coincident locations on the dividing line. The two image portions to either side of the transition band T–26 (Figure 8) can therefore and do form true complements to each other and are capable, therefore, of being joined, even though focussing is changed, to form a whole or mosaic image I–20 (Figure 8) of the object 20, a whole image which is geometrically similar to the object because though, during simultaneous or synchronous film frame exposure, the focus of the several lens systems and the corresponding planes of sharpness are changed and shifted, shape and relative locations of the points of division into its components either as object sections or image sections are unaltered. In similar manner the object square 21 of Figure 7 is recorded on frames of the films F–2 and F–3 in two respective image portions that are truly complementary and in which relative locations of points of division are retained throughout change of focus and thus made capable of being combined to form a true image I–21 (Figure 8) of the object square 21 of Figure 7. In like manner the diagonal object lines 22 and 23 of Figure 7 are recorded each in respective image sections, the one on frames of films F–1 and F–2 and the other on frames of films F–2 and F–3, respectively capable, for all focuses, of being combined to form true images I–22 and I–23 (Figure 8) of the respective objects 22 and 23 of Figure 7.

To coact in achieving synchronization of shift or motion of the three movable lenses B, a circuit arrangement, with manual controls, may be employed such as that shown in Figure 26, wherein the three lens-and-control units of Figures 3 and 4 are diagrammatically indicated at U–1, U–2 and U–3 and of each there is shown only the winding 163. In each unit, provision is made for extending the circuit of winding 163 to the exterior of the enclosing casing; for example, the two ends of the winding 163 are brought through small appropriately drilled holes, as at 166 in Figure 24, to the righthand under-face of the non-conductive ring carrier 160 where they are connected as by soldering to the heavier flexible insulated conductors 167$^a$ of the two-conductor cable 167 which lead to and are connected to one of the separable plug-and-socket members (not shown) and which is housed and secured to the bottom of the unit casing, the insulated conductors extending therefrom through drilled holes 171 in the casing wall 133 and through suitable free spaces and slots 147$^f$ and 162$^k$ for connection to the flexible terminal ends of the winding 163.

From each of the cameras C–1, C–2 and C–3 of Figures 1–4, therefore, cabled conductors may be run to a suitably located control panel indicated by the broken-line rectangle 190 in Figure 26. This control panel 190 is arranged to supply either alternating or unidirectional current or both to each of the three windings 163. At 200 is indicated a suitable source of electrical energy, preferably alternating current, which may be and preferably is of a voltage and frequency such as are in common use, for example, a frequency of 60 cycles at a voltage of 110 or 220, and as is usually available by simply plugging into an outlet receptacle, or by way of further example it may comprise a motor-generator unit or other readily portable power-supply unit. From source 200 conductors lead to a frequency changer 201 which may be of any suitable form or construction and is provided with suitable means for manually varying or changing the frequency at its output terminals, throughout a suitable range. From thence, conductors lead through a switch 202 to a constant-voltage regulator 203 of any suitable construction, and thence by way of a step-down transformer 204 to a filter 205 adapted or adjusted to filter out or block frequencies other than that selected or desired.

From the output side of filter 205, the circuit is extended by conductors 206 and 207, through a rheostat 208, a voltmeter VM indicating the voltage across the circuit 206—207. From the latter, through circuit connections as shown in Figure 26, the windings 163 of the units U–1, U–2 and U–3 are individually supplied with alternating current through individual manual controls such as the rheostats RC$^1$, RC$^2$ and RC$^3$, respectively, the respective A.C. voltages thus individually applied to the windings being indicated by voltmeters VM$^1$, VM$^2$ and VM$^3$. In this illustrative manner, the A.C. energizations of the three windings 163 may be equalized with precision and also, where necessary, the energization of the windings may be individually set or adjusted relative to one another as might be necessary to compensate for possible differences in the constants of various elements of the several units. For example, and bearing in mind the desirability of having the three B lenses of the three lens systems partake of identity of movement relative to the other lenses, it is possible that the rubber mounting ring 170 of one unit might respond, in yielding in axial direction, with somewhat greater or lesser resistance than does that of another unit, or the lens movement response in one unit might differ because, though the permanent magnets 145 in all of the units are of identical dimensions, the magnetization and hence flux density in the flux gap 150 of the permanent magnet of one unit might be somewhat different from that of the other, compensation for such possible differences is readily effected by relatively adjusting the respective rheostats RC$^1$, RC$^2$ and RC$^3$ to correspondingly adjust the respective alternating magnetic fields of the windings 163 and thus equalize the responsiveness of all the windings 163. The periodicity of the current energizing the several windings 163 insures synchronism of reciprocation or oscillation of the several B lenses in reversible strokes to either side, as viewed in Figure 24, of the normal at-rest position of the B lenses, that being, in the illustrative embodiment, at the mid-point of the maximum range of axial movement of the B lens, illustratively 0.012 inch; the permanent magnets 145 of the several units are assembled to the latter so that the same pole piece of each, for example the pole piece 144$^g$, is of the same polarity, and windings 163 (Figure 26) are connected to the A.C. supply circuit in the same sense so that in each unit the strokes of oscillation of the B lens are directionally the same relative to the film plane.

Windings 163 of the several units (Figure 26) may also be energized by unidirectional current from any suitable source, such as a rectifier 213 connected at its input to the alternating current source 200. Rectifier 213 may be of any suitable type such as a full-wave rectifier and preferably also includes means such as an input step-down transformer preferably variable or controllable for bringing the voltage of its direct-current output within the desired range, and selectable at will as to value. From rectifier 213, the circuit leads through a main switch 216, an ammeter AM, a rheostat 217, and a reversing switch 219 from which a conductor 209 connects to conductor 207 to which, as shown and as above mentioned, one side of each of the several windings 163 is connected, and from this reversible switch 219 there extends another conductor 210 to which the other sides of the three windings 163 of units U–1, U–2 and U–3 are connected, respectively, by rheostat RD$^1$ and ammeter AM$^1$, rheostat RD$^2$ and ammeter AM$^2$, and rheostat RD$^3$ and ammeter AM$^3$. Thus the three windings 163 may be simultaneously energized by unidirectional current supplied to each in the same direction so as to achieve in each unit the same directional reaction of the unidirectional field thus produced by its winding 163 to the intense unidirectional magnetic flux in the respective flux gaps 150, this reaction effecting a displacing force in axial direction upon the lens carrier ring 160 and hence upon the B lens which it carries, thereby effecting, in the absence of alternating-current energization, a shift from the normal or at-rest position of each B lens of controllable magnitude either toward the image plane or away from the image plane, depending upon the direction of the unidirectional current as may be determined or selected by the reversing switch 219. Such conjoint or synchronous shift may be used to change focus of the several lens systems. Also, such conjoint shift may be utilized as a biasing shift of the B lenses to coact with the alternating-current magnetic field when windings 163 are also so energized, as is later described.

The extent or magnitude of shift or bias should be the same for the B lenses of the three units U–1, U–2 and U–3, with this illustrative form of lens system; again, because there might be differences or variations in the constants of various elements of the several units, such as a difference in yieldability of the rubber mounting ring 170 or because the permanent magnets 145 might exert magnetic fields at their flux gaps that are of different magnitudes or intensities, compensation for such differences or changes are readily effected by determining the relative magnitudes of different-current energization of the windings 163, and this may be done by means of the respective current controls such as the rheostats RD¹, RD² and RD³.

Once these compensatory settings have been made, the direct-current energization of the several windings 163 as a whole and for control thereof in unison is effected by the rheostat or current control 217 and, directionally, by the reversing switch 219, total current energization being visually indicated by the ammeter AM; such energization may be cut in or cut out by the main switch 216. In like manner, the A.C. energization of the several windings 163 may be cut in or cut out as at the main switch 202, total A.C. energization thereof for action thereof in unison being controllable as to magnitude by way of the current control or rheostat 208, operable at whatever frequency is selected at the variable frequency source 201. Thus, conjoint A.C. and D.C. energization of the unit windings 163 according to need may be effected with both main switches 202 and 216 closed, or either A.C. or D.C. energization of the windings 163 may be effected independently by selection at the switches 202 and 216.

In the presently described embodiment of lens systems, the lenses B of the three cameras C–1, C–2, and C–3 are preferably set into synchronous oscillation, in strokes of the same length and with the locus of the strokes of movement relative to the remaining lenses being the same in all three lens systems L–1, L–2 and L–3; for purposes of initial illustration, the three windings 163 (Figures 24 and 26) are energized, by closure of switch 202, with alternating current of selected frequency, selected from the variable frequency source 201, so as to shift, in step, the respective focuses or planes of sharpness of the three lens systems from a point or plane relatively close to the respective cameras to a point or plane relatively remote, such as at infinity, on one stroke of the synchronized movement of lenses B, and, on the reverse stroke thereof, to shift, in step, the respective planes of sharpness from the remote plane or infinity to the point or plane relatively close. The frequency of the energizing currents of the three windings 163 is selected so that the synchronized oscillating lenses B of the three lens systems L–1, L–2 and L–3 partake of at least one complete stroke of movement, and as later described preferably partake of a good many oscillations or cycles of reversible strokes of movement, for each simultaneous presentation of the three film frames at F–1, F–2 and F–3 (Figures 3 and 4) by the synchronously driven film pull-downs of the three cameras. In this manner, the respective film frames record an infinite number of images of their respective object sections O–1, O–2 and O–3 (Figure 7), the respective recordings comprising an infinite number of images of the respective object sections with each of the infinite number of images so recorded corresponding to a different focus or plane of sharpness, and, all being of the same size, the in-focus and out-of-focus images on each frame register one with another throughout such change in focus.

The frequency of the synchronous oscillations of the lenses B of the three lens systems L–1, L–2 and L–3 is preferably relatively high, according to need or circumstances, by selecting at the variable frequency source 201 a suitable frequency of the alternating current simultaneously supplied to the three windings 163 (Figure 6), the common current control such as rheostat 208 being set, as above already noted, to give the three lenses B synchronous oscillations of the same length of stroke such that the focuses of the several lens system are conjointly shifted within any desired range between a point near the camera to infinity on one stroke and then back on the other stroke. The selected frequency need not but can be a suitable multiple of the rate of simultaneous exposure, by the synchronized pull-down mechanisms and shutters of the several cameras, of frames of films F–1, F–2 and F–3, such as 24 frames per second. Synchronous oscillation of the lenses B may thus be 24 cycles per second, or 48, or any other higher multiple, and for reasons about to be explained the frequency of synchronous oscillation, whether or not such a multiple, is preferably considerably higher, such as audio frequencies much in excess of 48.

Such high frequencies of synchronous relative movement of the lenses of the lens systems are desirable, as in this illustrative embodiment, to facilitate conjoint use of such long-focal-length lens systems in mosaic photography in that a light-eclipsing action (later described) takes place and the several lens systems cause their respective films F–1, F–2 and F–3 to record their respective object sections, such as object sections O–1, O–2 and O–3 of Figure 7, in more sharply defined images throughout the range of change of focus, while maintaining other coactions, than would be the case otherwise. This is of advantage not only in achieving improved quality of the object-images in and throughout the areas of the three image sections I–1, I–2 and I–3 of Figure 8, but also in coacting, as later described, in achieving non-obscured clarity of image registration at those margins or boundaries of the film-recorded section images where, as in mosaic combining by projection, there is to be mutual overlap, such as throughout the width of the vertical transition bands T–26 and T–27 of Figure 8.

The lens systems L–1, L–2 and L–3, each comprising, illustratively, lenses A, B, C and D as already described, may be constructed, as to their optical coactions and characteristics, according to the principles of U.S. Patent No. 2,176,108 in which several forms are described in one of which all of the lens elements partake of movement and in another of which several are fixed and the rest of the lens elements partake of movement relative thereto; of these I have selected herein, for purposes of illustration but not by way of limitation, the latter form in that lenses A, B, C and D may be considered to correspond respectively to the four lenses 230, 231, 232 and 233 of that patent of which lens 231 is movable relative to the rest; the spacings of the lens elements A, B, C and D along the axis O—X may be like those defined in the patent and the movable lens B may have a range of axial movement, as illustratively set forth above, commensurate with that mentioned in the patent, all for the purpose of achieving movement of the movable lens during exposure so as in turn to produce at the image plane, such as a film, by the coactions between the several lenses, an infinite number of images of the scene or object, each image corresponding to a different focus or plane of sharpness and all of the thus recorded images being of the same size and registering throughout such change in focus. The change in focus or shift of plane of sharpness achieved by movement of the movable lens B may be from a point close to the camera, such as three feet or so, to a point infinitely remote from the camera or lens system, or as is later described, may be any selected portion of that range.

As above noted, the wide-angled scene or object W of Figure 7 is a view in which the several objects stand or fall in a single vertical plane at some distance from the multiple cameras, such as middle distance, in order to simplify and clarify the contrasts discussed above in connection with Figures 7a–7d relative to prior proposals or practices; it will now be apparent that, were the objects in the scene W of Figure 7 to be given a third dimension that is, depth, the discussed defects, difficulties and undesired results are vastly multiplied and no attempt is made to depict them beyond the diagrammatic representations discussed in connection with Figures 7a–7d. However, the further coactions and results achieved according to this invention are more readily understood when considered in relation to a wide-angle scene in which the object or objects cover considerable depth as well as a wide angle, and in that manner also the transition bands T–26 and T–27 briefly discussed above in connection with Figure 8 can be better understood, as well as the manner of achieving them.

Accordingly, in Figure 27, there is indicated, by the broken line rectangle WD, such a wide-angle scene in which the object or objects or scene have considerable depth as well as wide angle, which of course would appear in perspective to the eye, is for simplicity of illustration typified by a single three-dimensional object O of uniform width and height but of considerable length so as to extend, as at the left end thereof in Figure 27, from a point somewhat near the several cameras to a point, at its right end, that is a considerable distance therefrom. For convenience, the object O is in the form of a long right-angled parallelepiped of small cross-section. As in Figure 7, this wide-angle scene is to be "taken" in three sections, such as indicated by the broken lines 26 and 27; for discussion, the objects O is thus to be subdivided into three object portions designated O–11, O–12 and O–13, subtended respectively by three camera angles of view A–1, A–2 and A–3 (Figures 3 and 4) for recording on their respective films F–1, F–2 and F–3, in the illustrative optical relations and geometry above described.

In Figure 27a are shown, not necessarily to scale, so much of the three negative films F–1, F–2 and F–3 as correspond to one frame of each simultaneously exposed, in an arrangement like that of Figure 4, to this wide-angle scene WD by the respective synchronized cameras and associated light-dividing and light-controlling means; here are shown, as in the developed negatives, the respective images and related and coacting areas recorded or produced within the frame areas of the respective films, thus to facilitate amplification of description of the actions and coactions of the various parts and respective controls thus far above described.

In the embodiment now under consideration (Figures 3 and 4), the apertures of the three cameras C–1, C–2 and C–3, may be all of the same size; illustratively and not by way of limitation, as in standard 35 mm. motion-picture cameras, they are rectangular and may have a longer dimension or width of illustratively 0.868" and they may be of usual height, a height selected according to the desired height of frame usually related to standard sprocket holes of the film such as, as in Figure 27a, four sprocket holes per film frame. In Figure 4, therefore, the several films are conjointly advanced, in such illustrative amount, by the synchrononized pull-down mechanisms that operate in the intervals between film frame exposures. The parallel upper and lower edges of the apertures determine the upper and lower parallel edges or boundaries of the frames as is usual, and as appears clearly in Figure 27a; the extent to which the full widths of the respective apertures are utilized, in this invention, for image recording together with areas or portions thereof for effecting image registration at the transition bands is predeterminable as to each film by controls of various of the optical parts and devices described in connection with Figures 3 and 4, thereby to achieve precision of image overlap and registration at the mosaic junctions and to achieve such respective and opposite gradations of image densities, on the respective films, of those portions of the scene or object that are ultimately to overlap that there is not only substantial uniformity, in the ultimate overlap, of image density and light intensity throughout the overlapped image portions but also substantially similar image density and light intensity as those of respectively adjoining non-overlapping image sections, thus also avoiding another defect of prior proposals and practices, namely the accentuation of the attempted junctions by bands or regions of contrasting densities and light intensities at the overlap.

In Figure 27a, with respect to the image section O–11 of Figure 27, the frame FR–1 on film F–1 comprises three areas: area AR–1 which occupies the major portion of the total frame area and in it is recorded the image I–11 of the object portion O–11, a very narrow vertical parallel-sided area GR–1, and a wider vertical parallel-sided area BL–1. To the right of the frame FR–1 is an area marked ST which extends longitudinally of the film F–1 being an area reserved usually for the sound track, between the aligned right-hand vertical edges of the frames and up to about 0.015" from the sprocket holes. If the film is not to contain sound track, and this applies also to films F–2 and F–3, the aperture width is simply widened so that vertical boundary of the frame extends in close but safe proximity to the sprocket holes.

Frame FR–1 (Figure 27a) shows what camera C–1 "sees" at its image plane, through its aperture and, so far as recording image I–11 of the object section O–11 is concerned, the image I–11 is upside down; it is not reversed left-to-right as would be the case of image recording by the center camera C–2 (later described) because of the interpositioning of the reflecting surface 50 of the mirror M–1 as will be clear by treating and tracing, as light rays, the broken lines which form the angle of view A–1 and which are bent by the mirror (see Figure 4).

Before considering the areas GR–1 and BL–1 of frame FR–1, it will be helpful to consider frame FR–2 of film F–2 exposed by center camera C–2 to the angle of view A–2 that is imposed upon camera C–2 by the coacting optical devices above described and intended for the "taking" of a center image portion O–12 (Figure 27) of object O. In the illustration of Figures 3 and 4 the center angle of view A–2, being somewhat less than the left angle of view A–1, a lesser amount of the total possible aperture width and hence a lesser amount of the maximum possible frame width is utilized; accordingly the total width of the aperture and of the available frame is not utilized, thus leaving longitudinal sound track ST (Figure 27a) adjacent the sprocket holes on both sides of the film, utilizable, where desired, for additional sound recordings. Within the available film frame area FR–2, there is a substantial center area AR–2 within which is recorded the image I–12 of the object portion O–12 (Figure 27) as bounded by the vertical lines or planes 26 and 27; this image I–12 is upside down and reversed left to right. The right end of image I–12 corresponds to the left end of image I–11; to the right of the center area AR–2 is a very narrow vertical parallel-sided area GR–21 and the next to the latter is a wider vertical parallel-sided area BL–21. The area GR–21 of the center film F–2 is related to the narrow area GR–1 of the left film F–1.

As for film frame FR–3 of film F–3 (Figure 27a), that comprises an area AR–3 that utilizes the major portion of the available aperture width and frame area, the film having a sound track area ST as indicated. Within the area AR–3 is recorded the image I–13 as the latter appears in the angle of view A–3 (Figures 3 and 4) allocated to the right camera C–3 as above described, up to the line or plane 27 (Figure 27); image I–13 is upside down but is not reversed left to right because of the interposed reflecting face 50' of mirror M–3 as will be clear from tracing the bent broken-line sides, treating them as light rays, of the angle of view A–3 (Figure 4). To the left of area AR–3 is a very narrow vertical parallel-sided area GR–3 and next to it is a wider vertical parallel-sided area BL–2. The narrow area GR–3 of film F–3 is related to the similar parallel-sided area GR–23 of film F–2 and to the left of area GR–23 is a wider area BL–23.

Bearing in mind the geometric relationships described above in connection with Figures 3 and 4, particularly with respect to the structure and positioning of mirror M–1 and vane V–1 as interrelated with the two angles of view A–1 and A–2, and similar features of structure and of relationship of mirror M–3 and vane V–3 to the angles of view A–2 and A–3, the vertical plane that is common to angles A–1 and A–2 is represented in Figure 27 by the line 26 and the vertical plane between angles A–2 and A–3 is the line 27, for it is along the length of these respective planes, since the objects in the scene WD of Figure 27 have great depth, that this deep scene is to be divided and allocated to the respective cameras, in contrast to the flat or plane scene W of Figure 7. With high frequency of synchronous oscillation of the lenses B of the three lens systems, the focus of the three lens systems L–1, L–2 and L–3 and the combined plane of sharpness shifts, as above described, on each stroke between a point or location close to the cameras, such as a fore part of image portion O–11 of Figure 27, and a point far remote from the cameras, such as a point on a rear part of image portion O–13, but whatever the size of the image as recorded for any instantaneous value of focus on any one of the films F–1, F–2 and F–3 of Figure 27a, such as image I–12, or any part of it, of object section O–12 which may be considered to be at about middle distance from the cameras, cannot be affected, by displacement or, with the presently described illustrative lenses, by dimensional change, in relation thereto and for that instantaneous focus and corresponding plane of sharpness, of the necessarily out-of-focus images I–11 (within area AR–1) and I–13 (within area AR–3) concurrently recorded on the films F–1 and F–3, and vice versa, for such detrimental relative displacement is precluded and, desirably, also relative dimensional change is precluded. In no case is the nucleus of an object point on a dividing line shifted for opposite displacement in adjacent image sections with change of focus as was described in connection with Figures 7a–7d; for example, no such relative displacement, with resultant separation or fragmentation, takes place between image I–11 and image I–12 or between image I–12 and image I–13 as takes place with respect to the image portions of the diagonal line objects 22 and 23 of Figure 7 as is indicated in and described in connection with Figures 7a and 7b, nor is there addition or loss of image parts as is indicated and described in connection with Figures 7c and 7d with respect to the respective portions of the circle image 20 and the square image 21 of Figure 7. This becomes clearer upon consideration of Figure 27b in which is diagrammatically indicated a mosaic combining, as by projection on a wide screen by three motion-picture projectors, of the respective position films made from the negatives F–1, F–2 and F–3 of Figure 27a, bearing in mind that in course of printing such positive films from the negatives or in mosaically-combined projection thereof or both, the respective images I–11, I–12 and I–13 (Figure 27b) are made to be right side up and the above-described left-to-right reversal of the image I–12 of film F–2 (Figure 27a) corrected by reversal in printing or in projection of either that film F–2 or both films F–1 and F–3 or by the use of mirrors in the projection paths of the side projectors; the result of such corrective reversals with ultimate mosaic combining, whether by projection or on film, is indicated in and is clear from Figure 27b. Moreover, because the reflecting surfaces 50 and 50' of mirrors M–1 and M–3 (Figures 3 and 4) provide optically the effect or condition of having the three cameras "view" the scene from the same point, grave defects caused by parallax and which are multiplied and compounded in prior proposals or practices by changes accompanying change in focus and by other factors, are avoided.

In the mosaically-combined projection indicated in Figure 27b, the lines or planes 26 and 27 of subdivision do not appear just as they do not appear in Figure 8 and there are present, instead, visually virtually imperceptible vertical transition bands, being those described above in connection with Figure 8 and being therefore similarly identified in Figure 27b by the respective vertical parallel-sided narrow transition or overlap bands T–26 and T–27, being shown as stippled to indicate their presence; their widths are determined by the widths of the narrow vertical parallel-sided areas GR–1, GR–21, GR–3 and GR–23 and the respective thereto-adjacent vertical parallel-sided areas BL–1, BL–21, BL–2 and BL–23 of the negative films of Figure 27a, and of course by the corresponding areas on the respective positive films. More particularly, transition band T–26 represents controlled overlapping, as in projection, of the film areas GR–1 and GR–21 and of the respective recordings therein, and transition band T–27 represents similar overlapping of the areas GR–3 and GR–23 and of the respective recordings therein.

Considering first the film areas GR–1 and GR–21 and their respectively adjoining areas BL–1 and BL–21 of Figure 27a, the respective recordings thereon are produced by actions and coactions of parts described above in connection with Figures 3 and 4, including the lens systems L–1 and L–2 whose coaction, during oscillation of the lenses B thereof, effect recordings of images I–11 and I–12 (Figures 27a and 27b) in areas AR–1 and AR–2 and of the characteristics just described and also recordings of the same characteristics in areas GR–1 and GR–21. In Figure 27c are shown schematically, on enlarged but not exact scale, portions of the two films F–1 and F–2 of Figure 27a but with corrective relative reversals thereof as above mentioned. More specifically, the large-scale film portion F–1 of Figure 27c is film F–1 of Figure 27a turned so that the image I–11 is right side up (compare with Figure 27) and the film portion F–2 is film F–2 of Figure 27a turned so that its image is right side up and turned also right to left (compare with Figure 27).

In Figures 3 and 4, to record image I–11 on film F–1, the latter receives, within the area AR–1, full or normal light intensity from the object portion O–11 (Figure 27) by way of the reflecting face 50 of mirror M–1 and lens system L–1, and to record image I–12 on film F–2, the latter receives, within the area AR–2, full or normal light intensity from the object portion O–12 by way of lens system L–2, the thin forward edge E–1 of mirror M–1 limiting or demarcating the respective fields or angles of view A–1 and A–2 (Figures 3 and 4) so far as concerns the corresponding pencils of full-intensity light rays, with the result that there is corresponding demarcation on films F–1 and F–2 of their respective image-recording areas AR–1 and AR–2, the former at its right-hand side in Figure 27a and the latter also at the right-hand side thereof in Figure 27a, these boundaries or demarcations being better indicated by the broken vertical lines 231 and 232 in Figure 27c wherein the two films, on larger scale, are correctively reversed with respect to one-another as above described; as there indicated by the relatively heavy lines that outline the image portions I–11 and I–12, the former is recorded in full density in area AR–1 up to the vertical line of demarcation 231 and the latter in area AR–2 up to the vertical boundary line 232.

Due, however, to the optical action of this sharp front edge E–1 of mirror M–1 and with which the vane V–1 can coact as later noted, there is image recording of object O–11 beyond this boundary line 231 and image recording of object O–12 beyond the boundary line 232, in each case of progressively diminishing density and throughout a very narrow vertical area as is indicated with some exaggeration of its width by the stippled images aligned with the solid black lines of image I–11 adjacent the film area GR–1 and by the stippled images aligned with the heavy lines of image I–12 adjacent the film area GR–21, the stippling being of graduated density to indicate the gradation of image density from the full density at the boundary lines 231 and 232 to zero density at the respectively opposite boundary lines 233 and 234 of the narrow film areas GR–1 and GR–21. In effect, the thus-graded image recordings in these narrow areas are image recordings of object points lying in the vertical line or plane 26 of Figure 27 (and the same is true of image recordings of object points in the line or plane 26 of the flat object scene W of Figure 7); the thin forward edge E–1 of the mirror M–1 in effect divides light from such object points so that practically half the light goes to film F–1 and the other half to film F–2, each of diminishing intensity as the respective lens systems reach the limit of field of view, thus causing correspondingly downward graded image density crosswise of the narrow vertical film areas GR–1 and GR–21 as above described.

As indicated in Figure 27c, the downward gradation or diminishing of density of image recording, within the band GR–1 of film F–1, of object points is in the direction toward the right but in the vertical band GR–21 of film F–2 it is in a direction toward the left. There is no distortion or relative displacement of these graded image recordings even though the focus and plane of sharpness of the multiple lens systems or cameras is changed or shifted, for reasons such as above explained with respect to the image sections I–11, I–12 and I–13 of the object O of Figure 27, and accordingly if the films F–1 and F–2, or positives thereof, are superimposed, or are projected, so that the film areas GR–1 and GR–21 overlap each other, precise registry of the companion graded-density images takes place with the oppositely graduated densities respectively complementing each other to provide substantially uniform and equalized brightness or light intensity across the transition band T–26 (Figure 27b).

Coacting with the above is the non-reflecting very thin vane V–1 (Figures 3 and 4). It is aligned with the non-reflecting mirror-truncating face 55, is exceedingly thin so as not to obstruct the image-recording actions on film F–2 above described, and extends forwardly in the plane of demarcation between the angles of view A–1 and A–2 so as not to interfere with knife-edge E–1 in its actions, including its light-dividing effects for producing graded-density of image-recording in areas GR–1 and GR–21. Mirror M–1, aided by vane V–1, assures that no light reaches the film F–2 to the left of the transition or gradation area GR–21 in Figure 27c so that the wider vertical area BL–21 records no image and appears in the negative as a transparency, with a vertical boundary at its right end, as indicated by broken line 234, which thus demarcates the gradation area GR–21. Area BL–21 has a left vertical boundary indicated by the line 236 that is determined by the side edge of the camera aperture. In the positive film the area BL–21 is devoid of images and is opaque throughout; it forms a light-blocking medium that thereby optically and physically marks off the left boundary of the transition or gradation area GR–21 as along the broken line 234; how these respective areas GR–21 and BL–21 coact in mosaic combining is later described.

Vane V–1 stands in the path of light rays that could otherwise reach the film F–1 from points or objects to the right of the intended left object section (object section O–1 of Figure 7, or object section O–11 of Figure 27), such as points or object portions intended to be image-recorded by the center camera C–2 and its film F–2; it thus precludes the production on film F–1, to the right of the gradation area GR–1 (Figure 27c), of spurious images. More particularly, however, vane V–1, or at least a part of it, is "seen" at the image plane of camera C–1, and on film F–1 it causes the production, immediately adjacent to the gradation area GR–1, of a transparency on the negative film and hence opaqueness on the positive film which extends throughout the wider vertical area BL–1. The latter thus coacts to form the right-hand boundary (Figure 27c) or line of demarcation 233 of the transition or gradation area GR–1, that boundary corresponding to the vertical line in which the vane V–1 and the mirror knife-edge E–1 meet; this recorded transparency, in the area BL–1, extends to the right in Figure 27c to the line 233 which is determined by the vertical side edge of the camera aperture. In the positive film, area BL–1 is devoid of images and provides a projection-light-source blocking means in effecting mosaic combining by projection.

In the above-mentioned practical embodiment, excellent results have been achieved where the width of the blocking areas BL–1 and BL–21 is about 0.055", the gradation areas GR–1 and GR–21 being about 0.017" wide as above noted.

As for film areas GR–3 and GR–23 and their respectively adjoining areas BL–3 and BL–23 of films F–3 and F–2 of Figure 27a, the gradation areas GR–3 and GR–23 have thereon respective image recordings of object points lying in the line or plane of subdivision 27 (Figure 27) which is determined by sharp mirror edge E–3, the respective gradations of image density being in opposite directions relative to each other, from full density where the narrow vertical gradation or transition areas GR–3 and GR–23 respectively adjoin the image areas AR–3 and AR–2 to zero density where they respectively adjoin the blocking areas BL–2 and BL–23, the latter being transparencies in the negative film and being opaque in the positive film, all achieved by the coactions, with and upon the respective films F–2 and F–3 of the cameras C–2 and C–3, of the respective synchronously operating lens systems L–2 and L–3 and of the structural features of mirror M–3, including its sharp forward vertical edge E–3, and the vane V–3 and with respective demarcations, all as will now be clear in view of the foregoing detailed description of similar and companion parts by which the transition band T–26 (Figure 27b) is achieved for mosaically combining the left image section I–11 with the center image section I–12 as in Figure 27b; in view thereof, also, it is not believed necessary to depict in Figure 27c or to further describe the rest of the film F–2 and the thereto related film F–3 (which would be turned right-side up). Transition band T–27 is thus achievable with like precision and other advantages as in the case of transition band T–26.

In the gradation or transition areas or bands on the several films, the coactions of the several lens systems during synchronous shifting of their respective focus or planes of sharpness achieve distortion-free and non-displaced recording of the discussed fading-out or diminishing intensities of light coming from object points lying on the intended line of subdivision. This takes place without possibility of displacement of the graded images relative to the respective full density images, such as I–11, I–12 and I–13, due to the action of the mirror knife edge and the thin vertical front edge of the associated vane. For example, by the actions of these parts, camera C–1 (Figures 3 and 4) has, by way of the flat mirror surface 50, full-intensity image recording as of image I–11 up to the sharp edge E–1 which means up to line 231 of Figure 27c and then progressively loses image recording at and around the knife edge E–1 because it receives light of rapidly diminishing intensity represented by the graduated-density (from line 231 toward line 233) images in the film band GR–1 of Figure 27c. In like manner, but in reverse direction, by the action of the above parts, camera C–2 (Figures 3 and 4) has, by way of angle of view A-2, full-intensity image recording as of image I-12 up to the sharp mirror edge E-3 which means up to the line 232 of Figure 27c and then progressively loses image recording at and around the edge E-3 of mirror M-3 because it receives light of rapidly diminishing intensity represented by the graduated-density (from line 232 toward line 234) images in the film band GR-21 of Figure 27c. Faithful and registrable recordings of these images of fading density are aided by the above actions and coactions of the lens systems; at each subdivision there are at all times two such lens systems and image planes or films that receive light from such object points, yet neither lens system can or does detrimentally shift any of the latter (compare Figures 7a-7d) with conjoint change in focus of the several lens systems. Hence companion image recordings, oppositely graduated in density in the narrow gradation areas, can be superimposed with assurance of image registration in the overlap free from mismatch of adjacent image sections (Figures 7 and 27b) and with the transition bands (T-26 and T-27) free from detrimental contrasting light effects since the superimposed oppositely diminishing image densities are mutually compensating and provide for image density and light intensity across the overlap free from visually perceptible variations.

The opaque blocking areas coact during projection at the respective transition bands T-26 and T-27 (Figure 27b or Figure 8); each is next to its associated gradation area at the zero-image-density boundary thereof and blocks off light rays from the light source that projects that gradation area and the adjacent image area (see Figure 27c) so that, in projecting the films for mosaic combining, neither projecting light source can impinge upon the image projected by the other outside of the overlap or transition band. For example, in Figure 27c, blocking band or area BL-1 of film F-1 prevents light from the light source projecting film F-1 from reaching and impinging upon the screen-images of area AR-2 as projected by the light source that projects film F-2 and at the same time, blocking area BL-21 of film F-2 prevents light from the light source projecting film F-2 from reaching and impinging upon the screen-images of area AR-1 as projected by the light source that projects film F-1; between these two blocking effects as considered in the mosaic projection as in Figure 27b (and also Figure 7) extends the transition band T-26 within which the respective image projections corresponding to the vertical bands or areas GR-1 and GR-21 are overlapped with precise registration as above described.

Recurring to the graded-density image portions recorded in the gradation or transition areas, they may be achieved with nicety and with precision of control at the several lines of intended division of the wide-angled scene by relatively setting the several coacting parts to the illustrative optical and geometric relationships above described in connection with the parts that are carried by the base plate 30 (Figures 3, 4 and 5). For example, the three cameras C-1, C-2 and C-3, with the pivoting pins 121, 122 and 123 (Figure 5) fixing the relative locations of the centers of the entrance pupils P-1, P-2 and P-3 (Figure 4) of their lens systems and thus fixing the respective bases of the above-described isosceles triangles, may initially be given the intended angularity between their optical axes as by relative adjustment of the cameras about vertical axes of these pivoting pins; base plate 30 may be provided with arcuate slots 124 (Figure 5) and the cameras bases with clamping screws 125, as indicated in Figure 6, spaced from the pivot pins whereby to secure the cameras in their selected positions.

The mirror holders H-1 and H-3 may be fixedly positioned and secured to the base plate 30 particularly where their respective mirrors M-1 and M-3 are mounted therein, as illustratively above described, for selectably setting them so that their parts, such as the reflecting face, the sharp front edge, and the truncating face, fit into the desired optical geometry, such as the respective isosceles triangles, as by suitably spaced screws 125 secured, for example, as by suitably spaced screws 125 (Figure 6) that pass through holes in the base plate and are threaded into the bottom parts of the respective holders. If it is desired to provide for adjustable setting of the holders, that may be done, illustratively, as by providing appropriate leeway or clearance between the securing screws 125 and the holes 124 in the base plate, as is indicated in Figure 6, thus providing multi-directional shiftability for each end of the holder base. It is in the latter manner that the vane supports S-1 and S-3 are adjustably secured to the base plate 30 (see Figures 5 and 6) so that, for a selected setting of the mirrors M-1 and M-3 (Figure 4), the respective vanes V-1 and V-3 may be brought into the physical and optical relationships to their respective mirrors M-1 and M-3 such as those earlier above described.

With such illustrative mountings for the mirrors and vanes, the mirrors may be with facility and precision set so that forward knife edges E-1 and E-3 thereof (Figure 4) not only stand vertical as earlier above-described but also at the respective apexes of the isosceles triangles of which the base of one is the line joining entrance pupils P-1 and P-2 and the base of the other is the line joining entrance pupils P-2 and P-3.

More particularly, by the provisions for precision-setting of the respective mirrors M-1 and M-3 about their respective forward knife edges E-1 and E-3 as an axis for setting, the width of the "GR" areas of Figures 27a and 27c, being the gradation of transition film areas which are in projection to be overlapped to provide the relatively imperceptible transition bands T-26 and T-27 (Figures 27b and 8), may be varied at will. As described in connection with Figure 27c, these gradation or transition areas (for example, areas GR-1 and GR-21 in Figure 27c) may be considered to be of a width, for a given setting of the mirrors, appropriate to record therein only the graded-density images (the parts of graded stippling in Figure 27c); with long-focus lenses, that would be the case for a given common setting of the diaphragm controls 137 (Figure 24).

The width of the transition or gradation areas is, however, somewhat affected by change in the setting of the diaphragm openings; for example, at full diaphragm openings the width of the film recorded transition area is greater than at lesser diaphragm openings, that is, the diagrammatically indicated graded-density images in Figure 27c are longer in the direction crosswise of the films (Figures 27a and 27c) than at smaller diaphragm openings, for a given setting of the several parts as to optical and geometric relationship, such as the mirrors M-1 and M-2. Under these circumstances, these parts may be set to provide "AR" gradation areas on the films of a width corresponding to a selected standard of diaphragm openings appropriate for certain photographic needs or scenes or to an average diaphragm opening at each of the three lens systems L-1, L-2 and L-3 suitable for general or more usual conditions of wide-angle scene. Different conditions of scene, however, might require different diaphragm openings, with the result that, for a given setting of the parts, the same lengths of the several films F-1, F-2 and F-3 might have recorded on them graded-density transition image areas of widths that are not quite uniform but that vary according as the diaphragm openings are varied during the multi-film taking of the wide-angle scene. For practical purposes it is therefore preferred that the transition bands T-26 and T-27 (Figure 27b) representing projected registered overlap of transition images, be made to include, in addition to the graded-density images, also full-density images of the same portion of the object adjacent to the intended line of division of the scene; this may be achieved by causing one of the two cameras of adjacent angles of view to invade the angle of view of the other camera. For example, as between cameras C–1 and C–2 (Figures 3 and 4), mirror M–1 is set as by adjustment of the ball members B–3 and B–4 that engage its front and back faces (Figures 13–15) to give it a precise and minute angular shift in clock-wise direction as viewed in Figures 3 and 4 about the knife edge E–1 as a vertical axis, such setting of mirror M–1 causing its reflecting face 50 to shift the angle of view A–1 and its optical axis X–1 in clock-wise direction so that, while the center angle of view A–2 of the center camera C–2 remains substantially fixed, the left angle of view A–1 is made slightly to overlap the angle of view A–2. Alternatively, such slight overlap of the adjacent angles of view may be achieved by resetting the left camera C–1 about the vertical axis through its entrance pupil P–1 by minute shift in counter-clockwise direction, and thereby, due to the reflecting action of mirror face 50, shift the angle of view A–1 and its optical axis X–1 slightly in clock-wise direction. In like manner, the right angle of view A–3 of camera C–3 may be made to invade and overlap the center angle of view A–2, as by resetting mirror M–3 or camera C–13.

Thus, such overlaps for registration of full-density images are controllable from substantially zero (when primarily only the above graded-density images are to be registered in projection) to any selected amount, depending upon the above-described settings and in Figure 27, therefore, an illustratively selected extent for each of the two above-described overlaps is indicated, in exaggeration, at OL–1 for overlap by angle of view A–1 and at OL–3 for overlap by angle of view A–3.

The resultant effects at both lines 26 and 27 of wide-angle scene division may be better understood by further consideration of films F–1 and F–2 of cameras C–1 and C–2 respectively, with respect to the object sections O–11 and O–12 (Figure 27) and their respective recorded images. The image recording on film F–2 remains substantially the same as indicated in Figures 27a and 27c and described above. As for film F–1, however, the effect of the above resetting of the parts is to shift the image I–11 on film F–1 of Figure 27a to the left by an amount commensurate with the minute angle of shift in position of mirror M–1 (or of camera C–1) and to record, on image area AR–1, within the resultant interval thus provided between the shifted full-density image I–11 of object section O–11 and the gradation area GR–1, a full-density image of the left-hand portion of object O–12 of Figure 27 corresponding to the extent of overlap OL–1, thus duplicating on film F–1 the corresponding right-hand portion of image I–12 of film F–2 as seen in Figure 27a. The full-density image as seen in the film area AR–1 of Figure 27a is now longer for it includes the full-density image of object O–11 of Figure 27 plus a full-density image of object section O–12 to the extent of the overlap OL–1, just to the right of the line of scene division 26.

This is indicated diagrammatically and in exaggeration on film F–1 of Figure 27c where the broken line 237 represents the right-hand terminus of the full-density image of object section O–11 and the full-density image portion between the lines 237 and 231 represents the full-density image of the narrow vertical portion of object section O–12, just to the right of the division line 26, that corresponds in extent to the overlap OL–1 which is as much as camera C–1 "sees" of object O–12 and which is also viewed and film-recorded by the center camera C–2. Accordingly, the full-density image between the lines 237 and 231 is an exact duplicate, as to configuration, dimension and position as is a corresponding portion of image I–12 in Figure 27c just to the right of line 232 and up to line 238. Since the optical and geometrical locations of the knife edges E–1 of mirror M–1 and E–3 of mirror M–3 remain unchanged in resetting the parts for such overlaps OL–1 and OL–3, the respective locations of lines 231 and 232 remain unchanged and from them and into the respective gradation areas GR–1 and GR–21 extend graded-density images produced as above described, in the one case of object points lying in the plane in which terminates the angle of overlap of angle of view A–1 upon angle of view A–2 and in the other case of object points on object O–12 lying in the plane or line of division 26.

In mosaic combining of the above by projection, the overlapping of the projection beams is made greater than the width of the gradation areas GR–1 and GR–21 so that the full-density image portion from line 237 to line 231 of film F–1 overlaps a corresponding extent, from 232 to line 238, of the projection of full-density image I–12 of Figure 27c and so that the graded-density images projected via gradation areas GR–1 overlap the full-density image portions of image I–12 to the right of line 238 and the graded-density images projected by the gradation area GR–21 overlap the full-density projected image portions of image I–11 to the left of line 237. With such relative overlapping, conjoint change in diaphragm openings of the several lens systems may be freely made during multi-filming of the wide-angle scene; should such change cause changes in the graded-density images or in the gradation areas such as above indicated, they are optically virtually bridged over by the projected and respectively overlapping full-density image portions as just described. Moreover, it has been found in practice that, though full-density image portions are overlapped in projection, in extent corresponding to the overlap of adjacent angles of view, the precision of registration and absence of distortion and of relative displacements achieved due to such coactions as above described, light intensity in such overlap, in relation to that of the projection of other film portions, is free from undesirable visual defects or contrasts and in these respects the respective graded-density images aid or coact in their effect of graduating the light intensities at the respective ends of full-density image overlaps.

Amongst the just-mentioned coactions, with the presently-described embodiment of lenses, are those of the synchronously oscillating lens system L–1, L–2 and L–3 in which, because of the relatively long focal length thereof, it is preferred that the oscillations take place at relatively high frequency as earlier indicated; the light-eclipsing actions at high frequency of oscillation during simultaneous film frame exposures are also advantageous in contributing toward desirable precision of image recording at the respective boundaries or marginal regions of adjoining object sections, such as those discussed in connection with Figures 27, 27a, 27b and 27c, where in projection they are to adjoin or overlap, without mismatch and other defects such as those mentioned above. This is particularly so where, as in Figure 27, the objects of the wide-angle scene range from relatively near the cameras (such as the left or fore part of object O) to relatively distant (such as the right or rear part of object O). As the synchronous lens systems shift their focus, as within the just-stated range, from one plane of sharpness to another, light from the object points within that one plane of sharpness is reduced or cut off and light coming from the object or points in the other plane of sharpness is what is directed on to the respective films; the higher the frequency of this synchronous eclipsing action of the several lenses, the less dense will be the light striking the respective films per cycle of the frequency of eclipsing. These eclipsing actions, effective also with respect to light coming from objects or object points that are out-of-focus or outside an instantaneous plane of sharpness, materially, if not entirely, avoid so-called halation which is caused by reflection or refraction of light on or in the film.

These advantageous actions are retainable where the simultaneously shifting lenses B of the several lens systems are made to oscillate throughout a lesser range of lens movement than that given in the above illustration, such as, for example, when the wide-angle scene or object is of relatively small depth and is positioned in the wide angle of view at some location intermediate of extreme nearness and extreme remoteness from the several cameras, for in such case the selected frequency of synchronous lens oscillation may be retained and synchronous lens oscillation restricted to selected similar portions of the maximum range or stroke of relative movement. This is achieved by superimposing upon the alternating current that simultaneously energizes the three windings 163 (Figure 26) a unidirectional current, selected as to magnitude by the current control or rheostat 217 and as to direction by appropriately setting the reversing switch 219. The resultant unidirectional magnetic fields produced in the respective windings 163 react with the respective permanent magnet fields concentrated in the corresponding flux gaps 150 (see Figure 24); a steady force is exerted upon the respective windings 163 either toward the left in Figure 24, or to the right, according to the position of the reversing switch 219, thereby straining the respective rubber ring supports 170 to change uniformly the at-rest positions of the three lenses B to one side or the other of the normal mid-positions thereof, so that the synchronously applied alternating current in the several windings 163 effects synchronous oscillation of the three lenses but in shorter strokes the locus of which for each lens unit is the same, being determined by the amount of D.C. energization as by the current control 217, while the length of the oscillating strokes along the optical axis O—X is variable or selectable according to the amount of alternating current, determined at control 208, conjointly supplied to all three windings 163.

In this manner, quick simultaneous and synchronous selection of any desired similar portions, along their respective axes, of the three angles of view A–1, A–2 and A–3 (Figures 3 and 4) according to desire or according to circumstances, rather than to have the three lens systems synchronously shift their respective planes of sharpness throughout the entire range between a point close to the cameras to a point infinitely remote. For example, a wide angle scene may be of small depth and relatively close to the multiple camera structure; by the selections just described, the stroke of the three lenses B, still in synchronism, may be similarly shortened and shifted so as to synchronously sweep the respective planes of sharpness or focus of the three cameras only throughout that relatively small depth of scene or object; in like manner, whatever the distance of such a scene or object of small depth may be from the cameras, the corresponding new locus of oscillating strokes, the same for all these lens systems, is correspondingly selected by appropriately setting the controls (reversing switch 219 and rheostat 217) for the simultaneous D.C. energization of the three windings 163, the magnitude of stroke being synchronously selected at the A.C. current control 208. These various conjoint controls are easy and simple to operate and desired selections readily made; such controls as these, as well as the various indicating devices, can be readily calibrated in optical or photographic terms, thus further simplifying manual operation of the multi-camera system to meet varying conditions met with in practice.

Furthermore, as above indicated, I may utilize only conjoint direct-current energization of the three windings 163 to synchronously shift, as needed, during the taking of a wide-angle scene, the lenses B of the lens units L–1, L–2 and L–3 to effect conjoint change of focus and thus operate the system without the advantage of oscillation during synchronous film frame exposures; while with lens systems of long focal length there is then some loss of image-quality of the pictures in the film frame areas AR–1, AR–2 and AR–3 (Figure 27a), there are nevertheless achieved avoidance of mismatch, elimination of parallax effects, and many other advantages. Moreover, in these lens systems, when embodied in shorter focal lengths whereby to provide desirable wide-angle characteristics, there is substantial depth of field or of focus and high image quality at the image or film plane so that the eclipsing actions at high frequencies of oscillation can be dispensed with. Such an arrangement is shown in Figures 28–30 which, and the ensuing description thereof, will be more readily understood in the light of all of the foregoing. In Figure 28 are shown, in a manner generally similar to the showing in Figures 3 and 4 above described, three camera structures C–11, C–12 and C–13, assembled to the base plate 30; they are provided with identical lens systems L–11, L–12 and L–13, as diagrammatically indicated in Figure 28, being embodied in lens-control-units U–11, U–12 and U–13 which are constructed as is illustratively shown in Figure 29 and later described; these parts coact with mirror or reflector structures M–1 and M–3, sharp mirrow edges E–1 and E–3, and with vanes V–1 and V–3 respectively constructed and mounted, as in the respective holders H–1 and H–3 and supports S–1 and S–3 as already above described, except for certain relationships later mentioned, and they may be physically related to base 30 as above described in connection with Figures 5 and 6.

In Figure 28 are indicated the respective horizontal angles of view A–11, A–12 and A–13, having respective optical axes X–11, X–12 and X–13. Illustratively and for convenience of represenation, these angles of view are each about 45°, making a total of wide-angle view of about 135°. They can be smaller or larger; for example, each can be 48°, a total of 144°. The optical axes X–11, X–12 and X–13 intersect at the center of the entrance pupil P–12 of the lens system L–12 of the center camera C–12, the optical axis X–12 of the center angle of view A–12 coinciding with the optical axis O—X of lens system L–12, and, to allocate the side angles of view A–11 and A–13 respectively to the laterally and angularly displaced side cameras C–1 and C–3, coacting vane V–1 and mirror M–1 and coacting vane V–3 and mirror M–3 are disposed, geometrically and optically to each other and to the several lens systems and cameras, according to principles above described and schematically indicated in Figure 28. Thus, two isosceles triangles are formed by the entrance pupils P–11 and P–12 and the mirror knife-edge E–1, on the one hand, and by the entrance pupils P–12 and P–13 and the mirror knife-edge E–3, on the other hand, of equal vertex angles, with the reflecting mirror faces 50 and 50' respectively falling on the bisectors of the vertex angles; the respective bases of these two triangles are equal and may fall on the same straight line (that is, the centers of entrance pupils P–11, P–12 and P–13 lie on a straight line), whence the respective lines or planes bisecting the vertex angles are parallel as are also the reflecting faces 50 and 50', and of course at right angles to the base plate 30. The bases of these two triangles may be, illustratively, about 6.500" each. The angle of truncating of the mirrors M–1 and M–3, by their respective vertical faces 55 and 55', is thus easily determined so that these faces coincide with the respective vertical side planes of the center angle of view A–12; resting against and aligned therewith are, respectively, portions of the vanes V–1 and V–3 which stand in or coincide with the respective vertical planes through the mirror knife edges E–1 and E–2 that demark the center angle of view A–12. With these geometrical relationships, the angle between the optical axes of lens systems L–11 and L–12 is about 45° as is also the angle between the optical axes of lens systems L–12 and L–13.

The lens-and-control units U–11, U–12 and U–13 of Figure 28, embodying lens systems of wide angle characteristics, short focal length and substantial depth of field, and therefore well adapted for employment of lens elements of much smaller diameter than the lenses A, B, C and D of the longer-focal-length lens system of Figure 24, may be constructed according to the principles described above in connection with Figure 24 but of materially diminished over-all diameter, with individual parts correspondingly more diminutive than those employed in Figure 24 as is intended to be illustrated in Figure 29 in which such a diminutive unit, generally indicated by the reference character U', is shown in central vertical sectional view, as seen from the left, through any one of the units U–11, U–12 and U–13 of Figure 28. In Figure 29, parts similar, though differently shaped, to parts shown in and above described in connection with Figure 24 are identified by similar reference characters but primed; accordingly structural relationships thereof and their assembly into the small-diametered unit U' need not further be described and for greater simplicity of illustration, because of the smallness of the showing in Figure 29, the latter omits the external cable connecter and the internal wiring leading to the winding 163', reference being had to Figure 24 for these details. The lenses A', B', C' and D' are, as above noted, for small diameter and accordingly the movable lens B' is much smaller and lighter in weight than lens B of Figure 24, wherefore its mounting ring 160' and the winding 163' carried thereby are considerably smaller, as is also the rubber centering ring 170' which, however, instead of normally holding the lens B' at the midpoint of its maximum stroke of movement relative to the remaining lenses as in Figure 24, holds the lens B' not only coaxially of the optical axis O—X but at one end of this maximum stroke of movement. This may be either end of such stroke and for purposes of illustration Figure 29 shows the parts so interrelated that the normal at-rest position of movable lens B' is at the right-hand end of its maximum stroke of movement; in the absence of energization of the winding 163', the rubber centering ring 170' holds the lens B' in the stated at-rest position for it is free from stress or strain in axial direction. Upon energizing winding 163', rubber ring 160' yields and strains axially toward the left, shifting the position of lens B', under the uniform axial pull on winding 163' exerted by the high-intensity magnetic flux across the flux gap 150' produced by the permanent ring magnet 145' and concentrated in the gap by the pole pieces 144' and 146'. The axial magnetic pull and the axially stressed rubber ring quickly reach a condition of balance or equilibrium and the lens B' comes to rest and is held in a new position with corresponding change in focus and shift to a new plane of sharpness. In this manner, any focus or place of sharpness may be selected and imposed upon the camera from infinity to close-up. Upon subsequent selectable decrease in energization of winding 163' the axial magnetic pull is reduced and the axially strained elastic rubber ring 170' seeks a new condition of equilibrium or balance and moves the lens B' toward the right to a new position. Upon deenergizing of winding 163', rubber ring 170' restores the lens B' to its normal at-rest position at the end of its range of movement. For these purposes winding 163' is energized by selectable or controllable magnitude of unidirectional current; in the turns of the winding it flows in a direction to produce a magnetic field related to the concentrated unidirectional magnetic field across the flux gap 150' so that the latter exerts a force upon the winding 163' and hence upon its lens carrier 160' in a direction toward the left; depending upon the magnitude of the current in winding 163', lens B may be given any position along the length or locus of its range of axial movement.

Synchronous and conjoint direct-current energization of the windings 163' of the units U–11, U–12 and U–13 of Figure 28 can be illustratively and conveniently effected by a circuit arrangement as shown in Figure 30, that being in effect the direct-current portion of the electrical system portrayed in Figure 26 wherefore similar reference characters are used in Figure 30 for parts similar to those in Figure 26. In Figure 30 it will be seen that the energization of the windings 163' of the three units U–11, U–12 and U–13 is individually controllable by respective current controls such as rheostats $RD^1$, $RD^2$ and $RD^3$ for purposes of equalizing and making uniform the co-actions between the windings and their respective unidirectional permanent magnet fields and thereby compensate for possible differences in the constants or characteristics of certain of the parts of the respective units, such as, as noted above in connection with Figures 24 and 26, differences in magnetization of the respective permanent magnets 145', possible differences therein as to magnetic retentivity, and possible differences in yieldability and recovery of the respective rubber centering rings 170'; in these individual energizing circuits may be included current indicators such as ammeters $AM^1$, $AM^2$ and $AM^3$, to indicate relative magnitudes of direct energization of the windings resulting from the relative compensatory settings of the respective current controls, while the main current control, such as rheostat 217, serves to select at will, and in suitable gradations, the conjoint or simultaneous direct-current energization of all of the relatively compensated unit windings 163' for purposes of selectively shifting synchronously and in equal steps or increments the axial positions of the three lenses B, toward the left as the current control 217 is changed to increase the energization of windings 163' to position the respective planes of sharpness of the three lens systems L–11, L–12 and L–13 nearer to the respective cameras and up to positions very close thereto, according to photographic need or according to the distance between the wide-angle scene or object and the three cameras; at any setting, therefore, of the current control 217 of Figure 30, the axial forces, toward the left, in Figure 29, magnetically exerted upon the respective windings 163' of the several units are balanced by the oppositely directed stresses exerted by the axially strained rubber mounting rings 170', and thus for any such selected setting for the current control 217, the three lenses B' stand fixed each in the same position relative to their respective remaining and coacting lenses, and thus the respective planes of sharpness of the three lens systems L–11, L–12 and L–13 are at substantially the same distance from the camera and thus a wide-angle scene or object, or according to selection a portion thereof, that is at that distance is brought into focus conjointly in all of the adjacent angles of view. Because, for any conjointly set or selected focus for the several lens systems and their image planes and hence for the corresponding companion planes of sharpness, there is large depth of field in these lenses of short focal length, the need is lessened for conjoint relative oscillation, during conjoint exposures, of the lenses of the three systems, as in the embodiment of Figures 3, 4, 24 and 26 where, as above described in connection with one mode of operation thereof, light-eclipsing action at substantial frequency for each of the simultaneous exposures of the films is desirable; accordingly, in the arrangement of Figures 28–30, relative lens oscillation to sweep the plane of sharpness, as from close-up to infinity, during each of the conjoint film exposures, can be dispensed with and the just-described conjoint lens controls may be used to excellent advantage. Yet, because of the coactions of the several lens systems, and of the coactions between the lenses A' and B' and their resultant coactions with the objective lenses C' and D', the respective fields of view are maintained matchably correlated at the dividing line or lines throughout conjoint focus change and so also are the adjoining image sections recorded on the several films. In the illustrative embodiments, the relation between the entrance pupils P–11, P–12 and P–13 and their respective image or film planes remain fixed in each case throughout focus change and hence throughout the range of change in axial position of the respective lenses B'; with these optical characteristics, in-focus and out-of-focus images of the same object remain of the same size as focus is conjointly changed and the above matchable correlation follows because the respective fields of view, in this illustration, are correctively maintained against change in size.

For example, let it be assumed that the object O (Figure 27) is stationary and that, with respect to it, action takes place as by actors or some other moving object, with the action proceeding from the remotest part of the object O, which would be at the remote or right-hand end of object section O–13, toward the cameras to a point relatively close thereto, particularly with the moving actors or objects also moving toward the left so as to cross one or both of the dividing lines 27 and 26. First, the operator sets the current control 217 (Figure 30) which, and the ammeter AM, may be suitably calibrated in terms of object distance, focus, or the like, to conjointly position the three lenses B' of the three lens systems for maximum object distance or infinity focus; as the above action proceeds, and changes its object distance, even crossing from one angle of view to the next, control 217 is reset progressively or in steps as the moving parts of the scene approach the immediate camera foreground whereby the lenses B' are correspondingly shifted to new positions to progress or shift the focuses of the three lens systems toward and finally to foreground or close-up and thus conjointly and in unison progress their respective depths of field from remoteness to relative close-up whereby, it will be noted, there will always be a portion of the stationary object O in focus and other portions out of focus, namely, those portions that are outside of the depth of the multiple field provided at any stage or step of the conjoint focal settings. But, because of the above-described features and coactions, the respective fields of view are maintained matchably correlated at the dividing lines as focus is conjointly changed; there are no relative displacements or distortions or duplication or omission of portions of images of objects at the dividing lines 26 and 27 whether the objects are stationary or moving.

At the dividing line or lines, therefore, the image recordings on the respective films F–1, F–2 and F–3 in the arrangement of Figures 28–30 are substantially the same as those above described in connection with Figures 27, 27a, 27b and 27c, achieved selectively by relative setting of the parts of Figure 28 in the manner above-described in connection with Figures 3–6 and 13–23 to the description of all of which reference is to be made for details, it being noted that in Figure 28 similar parts involved in the selective settings thereof are identified in generally similar manner as they are in Figures 3, 4, 5 and 6.

The lens units U–11, U–12 and U–13 (Figure 28) are also provided with diaphragms which may take the form shown in Figure 29; in the latter, the diaphragm is shown at 222, provided with diaphragm opening 223, and is mounted coaxially to the optical axis O—X of the lenses A', B', C', D', conveniently by a tapered shell 221 which carries the diaphragm member 222 at its inner end where it is provided with suitable means for detachably securing it in position, as by the externally threaded portion thereof which is received by suitable internal threads provided in the pole-piece part 144'. The diaphragm opening 223, relative to the associated lenses, may be of a size appropriate for certain or particular photographic needs or scenes and, the diaphragm structure being readily removable, it may be replaced by one with a diaphragm having an opening 223 appropriate for other photographic needs or for other particular scenes; on the other hand, it may be replaced to provide a diaphragm of average opening suitable for general or more usual conditions of wide angle scenes. For any selected diaphragm opening, the parts of Figure 28 may be set to provide at the transition bands T–26 and T–27 (Figures 27b and 8) for overlap of only the graded-density images (the parts of graded stippling in Figure 27c) but where diaphragm openings are to be varied or changed, as by replacement of the diaphragm structure, it is preferred that the parts be set, as earlier above described, so that in projection there is overlapping and registration of full-density images of the same part, adjacent a dividing line, of the object, thus avoiding possible effects caused by change in width of the "GR" areas of the films due to changes in diaphragm opening.

The modification of the invention illustrated in Figures 28–30 is intended also to illustrate that, as indicated above in the earlier description of Figure 27a, provision need not be made on any one or more of the films for sound track areas ST but that, by increase in angle of view and in aperture width, recordings such as those above described may be made to utilize a frame area whose vertical sides extend as closely and safely as possible to the sprocket holes, say, up to 0.015", again assuming but without limitation thereto that standard 35 mm. film is employed. Thus, by way of illustration, aperture width may be on the order of 0.980"; also to illustrate that frame height can be other than equivalent to four sprocket holes, for example, it may be equivalent to six sprocket holes and hence on the order of 1.110" in which case, of course, the pull-down mechanism of Figure 25 operates to advance its film six sprocket holes per step.

In discussing elimination of sound track areas ST of Figure 27a, in connection with the long-focus lens systems and arrangement of Figures 3 and 4, it was pointed out that aperture widths for the three cameras C–1, C–2 and C–3 would be increased so that image recording would extend into otherwise sound-track areas; at the same time, however, the center angle of view A–2, since its magnitude is determined by the angle or the length of arc, as viewed in Figure 3, between the mirror knife edges E–1 and E–3 which in turn determine the location of the intended lines of division 26 and 27 in the wide-angle scene, has to be increased and for such purpose, in resetting the parts on the base plate 30 in Figures 3 and 4, the entrance pupil P–2 of the center camera C–2 is made to serve as a pivot or axis about which the left-hand isosceles triangle which has vane V–1 related to and knife-edge E–1 at one apex and camera C–1 at the left-hand apex, is swung in counter-clock wise direction, and the right-hand isosceles triangle which has vane V–3 related to and knife-edge E–3 at one apex and camera C–3 at its right-hand apex P–3, is swung in clock-wise direction, in equal amounts sufficient to give the center angle view A–2 the desired increased value, and then the thus relocated parts comprising the two side cameras, the mirror holders, and the vane supports are secured to the base plate 30. The modified form of the invention as shown in Figure 28 is intended to illustrate such a relocation of parts relative to the center camera and the entrance pupil of its lens system, and in Figure 28 the respective right-hand and left-hand isosceles triangles, by comparison with Figure 4, will be seen in respective positions swung farther away from the axis X–12 and about the entrance pupil P–12 of the center camera C–12, to provide a center angle of view A–12 considerably greater than the angle of view A–2 of Figures 3 and 4, with the bases of the two triangles falling on a straight line instead of making an angle with each other as in Figures 3 and 4. Conversely, if it is desired that one or more of the films in the modification of Figure 28 contain sound track areas, change in aperture widths for such purpose and decrease of center angle of view A–12 (where the film of the center camera is desired to carry sound track area) are effected as will now be clear in view of the detailed description of the arrangement of Figures 3 and 4. For example, one or both of the isosceles triangles in Figure 28 would be swung about the entrance pupil P–12 and toward the optical axis X–12 of the center camera C–12, according as one sound track area or two such areas are to be provided for on the film of the center camera, with corresponding change in width of the aperture of the latter.

Contributing difficulties in prior attempts at mosaic cinematography and projection include the fact that there has not been simultaneous exposure and, instead, there have been successive exposures, by the shutter or shutters, of the adjoining portions of a cross-moving object that is divided by the panel-dividing line, such as line 26 or 27 of Figure 7, with the result that, because of the intervening time interval, the later-recorded image (on one film) of the object portion to one side of the dividing line has moved or is displaced, due to the cross-motion of the object, relative to the other object portion and also is no longer a complement of the first-recorded image (on the other film) of the object portion to the other side of the dividing line. Mismatch and further confusion at the transition lines or bands, in projection, as diagrammatically indicated or included at Z in Figures 7a–7d results, and the greater the speed of cross-motion, the worse are these defects. Such defects can be overcome or materially alleviated by means now to be described in connection with Figures 9–12a.

Referring first to Figure 12, I have there shown schematically the three cameras related to the base 30, illustratively as described above as in connection with Figures 4 and 28; the respective driving motors, M, M, M, are constant-speed motors and as earlier described, preferably electrically interlocked synchronous motors so that their respective shafts, or shafts driven by them, and for convenience called "power shafts" and shown at 240, turn at the same angular velocity and without detrimental change or angular shift relative to one another. The end of each shaft 240 is constructed so that a companion shaft to be driven may be connected to it but only always in the same relative angular relation; thus, shafts 240 have a coaxial D-shaped hole 241 in their ends. This is a convenient form of spline to use; accordingly the flats 242 (Figure 11a) of the three shafts are desirably at the same position during rotation and at standstill. Where the cameras are to expose 26 film frames per second, the motors preferably operate at 1560 r.p.m., that is, one complete revolution per cycle of operation of film pull-down and shutter mechanism. For these purposes, any other suitable drive of the power shafts 240 may be provided, such as illustrated in Figure 12a where the shafts 240 may be driven, illustratively at 1560 r.p.m. and also without relative change in angular velocity and without angular shift relative to one another, from a single power source, such as a constant-speed motor 243, through suitable gearing connecting them to a common drive shaft 244 which may be in sections as shown to provide for angularities in the line of drive where the camera (see Figures 4 and 28) are not aligned, suitable universal couplings (as indicated in Figure 12a) being interposed, couplings either paired (as indicated) or otherwise constructed to transmit uniform or constant angular velocities; couplings of these types are known and need not be further described.

Turning now to Figures 10 and 11, each camera preferably comprises a casing having a bottom wall 246 by which each is secured to the base plate 30 and upon which, by suitable slideways (not shown), the camera box 247 is mounted for controlled manual shifting, relative to the lens system carried by the casing, for various purposes, such as for shifting the camera box out of photographing position to bring a focussing telescope into coaction with the lens system, and vice-versa; since such slideway arrangements for such various shifts are known, they need not be further described and the relative shiftability of these parts is simply indicated by reversible arrows in Figure 10. Adjacent a front wall (not shown) of the camera box is the usual rotatable shutter 250 in the form of a disc with a sector-shaped opening of about 170°, carried by shutter shaft 251 mounted in suitable bearings at one side of an upstanding partition wall 252 through which extends, by way of a bearing structure, the drive shaft 253 of the camera movement which is more or less schematically indicated, in Figure 10, as comprising a pull-down arm 254 provided with pull-down claws and actuated by a cam 255 on shaft 253 and a registration pin mechanism 256 driven by a cam 257 on shaft 253. The just-described camera movement, schematically indicated in Figure 10, is a well-known type, the pull-down arm 254 having two claws on each side for engaging simultaneously two perforations at each side of the film which is indicated at F and the registration pin mechanism having two pins, one at each side, the two mechanisms operating in overlapping relation so that the pins of one enter film perforations before the pins of the other are withdrawn from the sprocket holes in the film; the aperture plate is indicated at 258, adjacent the plane of rotation of the shutter 250. Accordingly, when the film is stationary for exposure by the sector-shaped opening of the shutter, the registration pin mechanism, which coacts with a pressure plate and register plate (not shown), holds the stationary portion of the film in the desired relation to the aperture of the aperture plate 258 and during the ensuing part of the rotation of the shutter to cut off light from the scene or object, the registration pin mechanism releases the stationary portion of the film just after entry of the pull-down claws into the film sprocket holes so that the ensuing cam-actuated swing of the pull-down arm 254 advances the film by the required amount for the next frame-exposure. One such complete cycle occurs for each revolution of the camera shaft 253 and of the shutter shaft 251 which are engaged together, at a 1 to 1 ratio of drive, by 90° helical gears 260 and 261 which thus also take care of the 90° relation between the two shafts. Driving power for the several cameras, as by individual motors or from a common drive shaft, is to be applied to the camera shaft 253 (Figure 10), preferably, according to my invention, by phasing means whereby the shutters of the respective cameras are made to coact to avoid mismatch at the dividing line or lines caused by relative displacements of images of portions of cross-moving objects divided at the dividing line.

To better understand these features of my invention, reference is made to Figure 9 in which is diagrammatically indicated, in the manner of Figures 7 and 27, a wide-angle scene WM with vertical dividing lines 26 and 27 which are determined by the three camera systems, thus dividing the scene into three object panels or sections; let it be assumed that, adjacent the upper part of the scene, there are two objects OB–12 and OB–34 that are moving crosswise of the scene, say, to the left, and that, at the instant portrayed in Figure 9, they are in instantaneous positions such that object OB–12 is divided, at line 26, into two half-portions OB–1 and OB–2 and that OB–34 is divided, at line 27, into two half-portions OB–3 and OB–4.

Bearing in mind that I am enabled, by the coactions between the respective lens systems of the several cameras, particularly where the lens systems coact also by way of maintaining constant, with changes in focus, their respective field sizes, to achieve the elimination or rectification of many of the mismatch defects heretofore met with and to do so without the use of a mirror between adjacent angles of view where the lens systems can be closely grouped together as in the diminutive form illustrated in Figure 29, I achieve material improvement, in coaction with these lens systems, by directionally interrelating the shutter movements of each two adjacent cameras and by phasing the shutters, all in relation to the dividing line between their respective object sections or panels. Considering first the feature of directional correlation of shutters of adjacent cameras, in Figure 9a I have diagrammatically indicated a close grouping of three lens system N–11, U–12, and U–13, with their respective cameras, and for the sake of simplicity they are shown as directed toward the respective left, center and right panels or object sections of the wide-angle scene WM; since the three optical systems are identical, they cause the respective object panels to be viewed at the respective film planes in the same manner and hence, for greater simplicity, the similar image reversals at the image planes may be disregarded. In Figure 9a, the respective camera shutters are shown at SH-1, SH-2 and SH-3, and their respective rotational drives are indicated by respective broken lines leading from their axes of rotation to the respective diagrammatically indicated cameras. As between any two adjacent fields of view and their respective cameras, the shutters of the latter are driven, relative to each other, in opposite directions, as is indicated by the respective arrows in Figure 9a.

Shutter SH-1 (Figure 9a) of the left camera rotates counter-clockwise and the shutter SH-2 of the adjacent or center camera rotates clockwise so that, in exposing the left and the center object panel to the respective coacting lens systems and their films, light from object portion OB-1 on one side of dividing line 26 and light from the adjacent complementary object portion OB-2 on the other side of dividing line 26 is permitted to reach the respective films F-1 and F-2 coincidentally from similar object points in the respective object portions as more of the respective object portions are exposed by movement of shutter SH-1 downwardly toward the left and by movement of shutter SH-2 downwardly toward the right. Without such reversal of the shutters of these adjacent camera systems, object portion OB-1 would be exposed by the one shutter to the one film considerably in advance of the exposure of object portion OB-2 by the other shutter to the other film, and, with object OB-12 in motion toward the left, the recorded image of object portion OB-2 would be displaced to the left with a portion of it cut off at the line 26 so that the two images are not true complements of one another, with resultant mismatch and other defects when it is attempted to mosaically combine the two. In like manner, similar defects would occur with respect to the image-recordings of portions OB-3 and OB-4 of object OB-34 that are divided at line 27; the image of the portion OB-3 would be recorded a material fraction of a cycle ahead of the recording of the image of portion OB-4; accordingly, in Figure 9a, shutter SH-3 of the right camera is driven in direction opposite to that of shutter SH-2 of the adjacent or center camera, as shown in Figure 9a. The left and right cameras can thus be built similarly as to direction of shutter drives and the center camera is constructed symmetrically and hence with the shutter axis and shaft located on the other side of the pull-down mechanism and aperture plate and its shutter shaft driven in opposite direction.

Preferably, however, I facilitate such directional correlation of the several shutters in that, by effecting optically a reversal of the image of one object section or panel relative to the image of the adjacent object section or panel and thus I am enabled to avoid the disadvantage of mechanisms to provide opposite directions of shutter drives. Thus, for example, by interposing the mirrors M-1 and M-3 as illustratively described above (see Figures 4 and 28) and with similar lens systems, illustratively those above described, and again, for greater simplicity, disregarding any image reversals or inversions caused by the similar lens systems, the center camera "views" the center object panel of Figure 9 in the same manner as does the center camera of the three-camera system of Figure 9a, and "views" it as diagrammatically indicated in Figure 9b, that is, object portion OB-2 (or its image) is at the upper left and object portion OB-3 is at the upper right, just as in Figure 9a; but shutter SH-2 need not be reversed as to its location and direction of rotation and, as shown in Figure 9b, it and its camera can be the same as the left camera and the right camera, all shutters rotating in the same (clockwise) direction, for mirror M-1 reverses the "view" (or image), right to left for the left camera and object portion OB-1 (or its image) occupies the upper left position the same as does its counterpart OB-2 for the center camera while mirror M-3 reverses the "view" (or image), left to right, for the right camera and object portion OB-4 (or its image) occupies the upper right position the same as does its counterpart OB-3 for center camera, all as shown in Figure 9b.

Thus, without having to reconstruct one of the two cameras, with reversal of direction of rotation of its shutter, that are to record respective image portions, divided at the dividing line (26 or 27), the optical system of one of them is made to reverse, left to right, its "view" (or the image thereof at the shuttered aperture), and the cameras and shutter drives can be the same. In Figure 9b, the shutters SH-2 and SH-3 of the center and right cameras expose to their respective films the object portions OB-3 and OB-4 (of object OB-34 divided at line 27) at the same point in their respective cycles, thus avoiding relative displacement of the respective images of object portions on opposite sides of the dividing line, as do shutters SH-2 and SH-1 of the center and left cameras with respect to object portions OB-2 and OB-1 into which object OB-12 is divided at line 26, all the shutters rotating in the same direction and avoiding the necessity of diverse or different camera structures relative to one another as in Figure 9a. Thus, where individual cameras are employed for the respective panel sections of the wide-angle scene, all may be similarly constructed, as above described so far in connection with Figure 10.

Between the drive shaft 253 of each camera and its power shaft 240 I interpose a controllable phasing mechanism generally indicated by the reference character 265 in Figure 10 and shown in enlarged sectional view in Figure 11. It is conveniently embodied as a separate unit comprising an L-shaped casing 266 whose horizontal portion underlies the drive shaft 253 to extend into engagement with the vertical partition 252 to which it is secured in any suitable manner so as to bring and maintain a horizontal shaft 267, mounted in suitable end bearings in the vertical portion of casing, in coaxial alignment with the drive shaft 253 as well as to maintain a splined connection between the two shafts; thus, the left end of shaft 267 may be provided with a square hole, as shown, to receive the squared end of shaft 253. The left wall of the vertical casing part is provided with a suitable opening (not shown) through which the splined shaft parts are engaged as the casing is moved to the left and secured to partition wall 252. Horizontal shaft 267 has fixed to it a helical gear 268 with which mates a companion helical gear 269 mounted to rotate a vertical axis, the two gears having a 1-to-1 driving ratio. The base of camera casing 246 (Figure 11), being secured to the main base plate 30, has a suitable aperture therein through which the power shaft 240 is exposed or made accessible, the power shafts 240 for the several cameras (Figures 12 and 12a) being located or fixed relative to one another after the several cameras, via their respective casing bases, are relatively located as was described in connection with Figure 5, and, with the camera box 247 in photographing position relative to the lens system, the verictal axis of helical gear 269 is in alignment with the axis of the corresponding power shaft 240 and an aperture in the base of camera box 247 (Figure 11) is brought into alignment with the opening in the base of casing 246 through which power shaft 240 is exposed or made accessible. Helical gear 269 is on a vertical shaft 270, by way of a suitably splined connection, illustratively as by making the shaft 270 square in cross-section as shown in Figures 10 and 11 and providing gear 267 with a square hole through which shaft 270 extends. The lower end portion 271 (Figure 11) of the shaft 270 is D-shaped in cross-section to enter the D-shaped hole 241 in the power shaft 240, as shown in Figures 11, 11a, 12 and 12a; its cross-section and drive-interfit or splining with the D-shaped hole 241 of shaft 240 is better shown in Figure 11a. At its upper end, shaft 270 has a knurled head 273 (Figures 10 and 11) whereby it may be manually shifted axially into or out of driving connection with power shaft 240, helical gear 269 remaining in driving connection with its companion gear 268 throughout axial shift of square shaft 270. In this manner, the square shaft 270 of any or all of the several cameras may be withdrawn from driving connection with its or their respective power shafts 240, for various purposes as later described and also to permit shifting of the camera box 247 relative to the camera casing 246 for such purposes as I mentioned earlier above; restoring square shaft 270 to driving connection with the corresponding power shaft 240 can be effected only by mating the flat part of shaft portion 271 with the flat 272 of the hole 241 in shaft 240 (see Figure 11a) so that, with all of the power shafts 240 electrically interlocked through their motor drive (Figure 12) or mechanically interlocked (Figure 12a), shafts 270 are re-connected to their respective power shafts 240 always without disturbing the relative rotative positions or phase relation of one to the other.

Coacting with the above, in each camera drive, is a means for manually setting the camera pull-down and shutter mechanism rotationally, as to its drive, relative to the retractable square shaft 270 so that, with the several shutters directionally correlated as to ratation as above described and illusratively indicated by the arrows in Figure 9a and Figure 9b, each shutter may be set, relative to its aperture and film-frame area of exposure or intended angle of view, to commence, upon subsequent conjoint rotation of all of the shutters, exposure at the same instant, by any two adjacent cameras, of the respective object portions divided at the dividing line of the two adjacent fields of view.

The just-described relationship, to be achieved in a manner about to be described, is diagrammatically indicated in Figures 9a and 9b wherein the leading edges of the exposure cut-outs or openings of the shutters SH-1, SH-2 and SH-3 are designated at EG-1, EG-2 and EG-3, respectively, the trailing edges of the shutter openings (which are the same) not being shown or only partially indicated. In Figure 9a, shutter edges EG-1 and EG-2 are shown in their interrelated desired relations for commencing at the same instant and synchronously continue the exposure to the respective films F-1 and F-2 of object portions OB-1 and OB-2 into which the object OB-12 (Figure 9) is divided at the dividing line 26; at the same time, shutter edge EG-3 has to bear a relation, rotatively, to the shutter edge EG-2 of the center camera so that, by the time edge EG-2 of shutter SH-2 commences to expose object portion OB-3 into which the object OB-34 (Figure 9) is divided at the dividing line 27, edge EG-3 of shutter SH-3 of the right camera commences at the same instant the exposure of the other object portion OB-4. In the arrangement shown in Figure 9b, in which the shutters rotate in the same direction and the interpositioned mirrors M-1 and M-3 reverse, left to right, the images of the respective right and left angles of view as earlier above-described, the desired interrelationship of the leading edges EG-1, EG-2 and EG-3 of the openings of the shutters of the three cameras is indicated and need not be further described.

For simplicity, these relationships are shown in Figures 9a and 9b with respect to the respective dividing lines which fall within aperture openings or film-frame image-recording areas and without regard to gradation areas or other areas to be overlapped as in the formation of transition bands 26 and 27 above described in connection with Figures 8, 27 and 27b. So long as the shutter-aperture edges of the cameras for adjacent angles of view are directionally co-ordinated and in point of timing are phased relative to the dividing line, illustratively as above set forth, detrimental relative displacement of image portions of cross-moving objects divided at the dividing line, even of those object portions included in reasonable overlaps to either side of the dividing line, does not occur.

Whatever the requirement, of which the above are illustrative, for phasing the respective shutters relative to the respective object portions into which the dividing line or lines divide the objects, the means I provide in each camera mechanism permits corrective phasing to be readily achieved of one shutter relative to the other or others; and illustrative mechanism for this purpose is shown in Figures 10 and 11, embodied in each camera mechanism and desirably coacting with the respective retractable or withdrawable shafts 270 which are in splined connection, as above described, with their respective helical gears 269, the latter having a square hole and the shaft being of square cross section.

Helical gear 269 meshes with gear 268 (Figure 10); gear 269 (Figure 11) rotates within a vertical cylindrical bore 274 suitably provided in the vertical portion of casing 266 and opening into the top and bottom walls of the casings where it is counter-bored to larger diameter and threaded as at 275 and 276; this bore 274 is suitably cut away intermediate of its ends and in a region juxtaposed to helical gear 268 so that the latter, rotating on its fixed horizontal axis or shaft 267 (Figure 10) and shaft axis being indicated at HX in Figure 11, enters the bore 274 sufficiently to mesh with the vertical helical gear 269 in the latter.

Helical gear 269 (Figure 11) is rotationally supported coaxially of the bore 274 in a manner such that it may be shifted in vertical direction. An illustrative arrangement is shown in Figure 11 and may comprise upper and lower bearings 277 and 278 which are preferably in the form of combined radial and thrust anti-friction bearings of which, of each, one element or race is suitably secured to a hub-like extension of gear 269 and may have a square hole through which square shaft 270 slidably extends, and the other element or race fits into the bore 274 with a snug sliding fit, substantially as indicated in Figure 11, and has a large central opening through which square shaft 270 can freely extend for rotation relative thereto. Such an arrangement of coactingly shiftable spaced bearings also gives the shaft 270 good radial support, for rotation, at axially spaced points therealong and also for whatever vertical position is given the gear 269 relative to the bore 274.

Provision is made for selectively positioning the helical gear 269 and its end bearings 277 and 278 lengthwise, as by upper and lower sleeves 281 and 282 which are received into the respective ends of the bore with a nice sliding fit and are adapted squarely to abut their inner ends against the non-rotating elements or races of the bearings 277 and 278, as shown, these sleeves being peripherally flanged and threaded at their upper ends for self-locking or tight reception into the threaded counter bores 275 and 276 respectively, the end faces of the sleeves being provided with suitable means to facilitate turning them, such as opposed recesses 283 for the reception of a spanner wrench. Accordingly, with all of the shafts 270 inter-engaged with their respective power shafts 240, the latter being interlocked as above described, and the parts being in at-rest position, the camera pull-down and shutter, being geared together at 260 and 261 (Figure 10), of the several cameras may now be rotationally set, the one with respect to the other and in relation to the particular relative shutter phasing that may be required and several illustrations of which are set out above, by appropriately setting or fixing the driving relation, in each camera, between the helical gear 269 (Figures 10 and 11) and the helical gear 268, as in the following manner:

Where there is wide discrepancy or material out-of-step relation among the several camera mechanisms, for example, such as would require a corrective relative shift corresponding angularly to the angle subtended by one or more teeth of the companion helical gears 268—269, gear 269 may be brought completely out of engagement with gear 268 as by rotational manipulation of the sleeves 281 and 282 upwardly or downwardly to a sufficient extent to disengage gear 269 from gear 268; during such disengaging movement square shaft 270 remains in fixed position due to its connection with its at-rest power shaft 240. Thereupon, by hand, the camera mechanism is rotated to turn gear 268 (Figure 10) in the desired corrective direction and angularly by an amount corresponding to one or more teeth as may be required, thus resulting in at least an approximation to the desired corrective shift. Gear 269 is now returned into meshing engagement with gear 268, by appropriately turning the upper and lower sleeves 281 and 282, the one to follow up the other, so that gear 269 is shifted along the shaft 270 in a direction toward the horizontal plane of the axis HX (Figure 11) of the gear 268; once the teeth of these two gears have commenced to inter-engage during this restoring movement, and with gear 269 held against rotation by its square shaft 270 which is locked in at-rest position due to its connection with the power shaft 240, continued shift of gear 269 turns gear 268 because of the relative helical character or pitch of the gear teeth, thus slowly turning the pull-down and shutter mechanism and, due to the screw-threaded arrangement of the two sleeves whereby a considerable turning movement of the sleeves is converted into a small axial movement and hence into a small axial shift of gear 269, the corresponding pull-down and shutter drive is turned through a very small degree or angle compared to the angle of turn coactingly given to the two sleeves to shift the gear 269, and thus the leading edge of the exposure opening of the corresponding shutter can be set with precision relative to its aperture plate opening or relative to the film-frame image-recording area. In like manner the shutters of the remaining cameras are set, each with respect to its retractable square shaft 270 which, during the setting, is held in at-rest position.

In some cases, a large relative change between the helical gears 269 and 268 such as an extent of several teeth may not be necessary; in such case, disengagement and re-meshing of gears 269 and 268 need not be had and the gear 269 is, under the micrometer-like action of the two threaded sleeves, shifted and set up or down relative to the fixed gear 268 and its axis HX by an amount to cause such a degree of turning of the camera mechanism due to the pitch of the gears as will bring the edge of its shutter opening into the desired relation. Shifting gear 269 upward turns the shutter in one direction, and vice versa; thus the required in-phase setting is greatly facilitated.

In either case, the gear 269 may have its mid-plane at or above or below the axis of fixed gear 268. In Figure 11, I have shown illustratively one of such ultimate positions of gear 269, with its mid-plane slightly above the axis HX of the gear 268. Thus, with the shutters of the several cameras directionally correlated for directional coaction, at the dividing line, of the shutters of adjacent cameras, the micrometer-like mechanism just described insures precise timed correlation thereof with respect to the image portions divided at the dividing lines; it also greatly facilitates in-phase or timed resetting of shutters where the apparatus, for reasons indicated above, may be rearranged for different or differing sizes of apertures or film-frame image-recording areas.

Once the several shutters are thus fixed in relation to the dividing line or lines, though the driving train of any or all of the cameras be interrupted as by retracting the corresponding shaft or shafts 270 from the power shafts 240 as for purposes indicated above, the in-phase relationship of the shutters relative to the dividing line or lines remains undisturbed upon the restoration of the driving connection of the shafts 270 with the power shafts 240, for those connections are always restored in the same rotative relation one to another, as above described. Moreover, the mechanism of Figure 11 has the advantage that it may be used to compensate for any discrepancy in or departure from the desired or intended synchronizing locking-together of the several power shafts 240; for the same reason, construction and operation of the apparatus are facilitated in that greater tolerances are permissible in interlocking the several power shafts 240.

Any suitable means may be employed to releasably hold the square shaft 270 (Figure 11) in either of its two positions, that is, in driving engagement with its power shaft 240 or in retracted or withdrawn position (upwardly in Figure 11) sufficient for its lower end to clear the horizontal wall of the camera box 247. Moreover, it is constructed to be reversibly assembled to the casing 266 and gear 269; thus, where the driving motors M are positioned at the top wall of the camera casing as in Figure 1 so that the corresponding power shafts 240 are above the casing 266, with downwardly projecting shafts, rather than below it, with upwardly projecting shafts, as in Figure 11, the shaft 270 is simply inverted so that its knurled head 273 is below the casing 266 and its drive-connecting end 271 projects upwardly from the casing 266 for action with the overhead drive shaft 240.

This application is a continuation-in-part of my application Serial No. 284,008, filed April 24, 1952, now abandoned.

From the foregoing description of several illustrative embodiments of the invention, its principles and the practice thereof will now be clear, and it will also be seen that the invention is of a thoroughly practical character and that it makes possible achievement of many advantages. It will also be seen that the various objects heretofore noted or indicated are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. Apparatus for taking in sections motion picture images of a wide angle scene or object on a corresponding number of films for subsequent mosaic combining as by film projection and for alleviating mismatch effects caused by objects in cross motion across junctions of adjacent sections comprising three camera mechanisms each of which has a lens system with control means for changing its focus, an aperture, a rotatable shutter associated with the aperture and having an exposure opening the leading edge of which, upon shutter rotation, sweeps past the aperture in an arcuate path, a pull-down mechanism for presenting film frames successively at said aperture, and a camera drive shaft from which said shutter and said pull-down mechanism are driven in fixed time relation to each other, each of said camera mechanisms having an angle of view less than the angle of the scene or object and said camera mechanisms having supporting means associating them together and locating their optical axes in a horizontal plane and at relative angles therebetween to encompass the wide angle scene in three adjacent edge adjoining fields of view of which one camera mechanism takes in a central portion of the scene and the remaining two take in respective left and right sections of the scene whereby the film recorded images of the respective scene sections are intended to match, as an ultimate projection, at adjoining edges thereof; three power shafts having means for driving them in synchronism; means forming driving connections between said synchronously driven power shafts and the respective camera drive shafts of the said three camera mechanisms for driving the shutters in respective directions that, with respect to any object crossing or intersected at the adjoining edges of any two scene sections, the arcuate paths of movement of the leading shutter edges of the two shutters operating in the two corresponding angles of view are directionally the same relative to the respective edges that adjoin and relative to the respective components of the object so crossing or intersected, the means forming said driving connections comprising also means for relatively setting the rotational angular relation between the shutters operating in any two adjacent angles of view of said three camera mechanisms to bring the leading edge of one shutter in phase with the edge of the other shutter and thereby simultaneously commence exposure, to effect simultaneous image recording, of the respective components of the object so crossing or intersected at said adjoining edges of the corresponding scene sections, said apparatus having interposed, in the path of the pencil of light emanating from the left scene section and also in the path of the pencil of light emanating from the right scene section, a mirror of the surface-reflecting type with its reflecting surface vertical, for reversing, left to right, the respective images of the said scene sections on the respective films of the corresponding left and right camera mechanisms, each of said mirrors having a relatively sharp front vertical edge formed by a bevelled non-reflecting surface that intersects the reflecting surface at an acute angle, said sharp edge of the first mirror demarcating optically the dividing line between the adjoining edges of the left scene section and the center scene section and the sharp edge of the second mirror demarcating the adjoining edges of the right scene section from the center scene section and thereby dividing optically the aforesaid crossing object into components respectively to either side thereof, said supporting means for said camera mechanisms having means, one for each of said mirrors, in the form of a frame open at its forward end for supporting the mirror with its reflecting surface vertical and said sharp edge at the open end of the frame together with means for setting the mirror and its sharp front edge to determine the center angle of view relative to the adjacent angle of view, said shutter-driving means comprising means providing respective axes of rotation for the shutters of the three camera mechanisms that are all located the same relative to the respective apertures and pull-down mechanisms thereof, with the driving connections providing drive of all three shutters in the same direction, said means for relatively setting the rotational angular relation between shutters as aforesaid comprising micrometer-like manually-controllable means.

2. An apparatus for taking in sections images of a wide scene or object on a corresponding number of films for subsequent mosaic combining comprising two cameras each having a lens system, an aperture, and means for presenting film at the latter for image recording; each of said cameras having an angle of view less than the angle of the scene or object and said cameras having supporting means in the form of a base plate on which they are associated together with their optical axes in a horizontal plane for dividing between them the angle of the scene or object into two adjacent edge-adjoining fields of view for the taking of corresponding image sections that are intended to substantially match at their adjoining edges when mosaically combined, one of said cameras being positioned on said base plate with its optical axis coincident with the axis of one of said fields of view and with the common vertex of both angles of view coincident with the entrance pupil of its lens system and the other camera being laterally and angularly displaced therefrom on said base plate, there being a mirror having a reflecting surface positionable vertically in the path of the pencil of light rays coming from the object section within the angle of view to bend the optical axis of the latter into coincidence with the optical axis of said other camera and to converge said pencil of light at the entrance pupil of its lens system whereby optically both cameras view their respective scene sections from substantially the same point and parallax effects are thereby alleviated, said mirror having a relatively sharp front vertical edge formed by a bevelled non-reflecting surface that intersects the reflecting surface at an acute angle, said base plate carrying a frame open at its front end and receiving said mirror therein with its sharp front edge at the open front end of the frame, with means coacting between the mirror and its frame adapted for manually setting the mirror so that its reflecting surface is vertical together with means for setting the mirror and its sharp front edge to demarcate optically the dividing line between the adjacent angles of view and the adjacent object sections, said bevelled non-reflecting edge of the mirror falling substantially in the plane between the adjacent angles of view, a non-reflecting opaque vane that is very thin and of good tensile strength, and means comprising two vertically spaced arms having means supporting them in relation to said base plate, said arms having secured thereto the respective ends of said vane and holding it taut and in a vertical plane aligned with and extending forward of said sharp front mirror edge and falling in the vertical plane demarcating the one angle of view from the other.

3. An apparatus as claimed in claim 2 in which said vane has a thickness on the order of 0.002 inch and is covered with optical black.

4. An apparatus as claimed in claim 2 in which at least one end of said vane is secured to its supporting arm by means manually operable to subject it to substantial tension.

5. An apparatus as claimed in claim 4 in which said means comprises a windless element carried in bearing means provided in the arm for winding one end of said vane, with means for locking it against rotation in unwinding direction.

6. An apparatus as claimed in claim 2 in which means are provided for setting at will said vertically spaced arms about an axis generally at right angles to said base plate to align said vane as aforesaid, with means for locking said arms in selected position.

7. An apparatus as claimed in claim 2 in which said other camera that is laterally and angularly displaced and said base plate are provided with means providing a vertical axis of pivotal movement of the camera relative to the base plate, said vertical axis passing through the center of the entrance pupil of the camera lens system, for setting the coacting relation between the latter and the reflecting mirror surface and said sharp front edge of the latter.

8. An apparatus as claimed in claim 2 in which said frame that carries the mirror and said base plate are provided with coacting means releasably securing them together and adapted, upon release, for selectable shift, including shift about a vertical axis, of the frame with its mirror relative to the base plate and thereby set the mirror for desired coaction with other optical elements.

9. An apparatus as claimed in claim 2 in which said frame has internal grooves and receives therein edge portions of the mirror, with means manually settable and coacting between the walls of said frame grooves and the front and back faces of the mirror for engaging said faces to hold the mirror in selected geometric relation of its reflecting surface with respect to the lens systems of both cameras.

10. An apparatus as claimed in claim 9 in which said settable means include three relatively rigid elements having substantially point contacts with the front face of the mirror and relatively widely distributed from each other to fix the plane of the points and resilient means coacting with the back face of the mirror for yieldingly pressing the latter with its front face against said rigid elements.

11. An apparatus as claimed in claim 2 in which said frame has internal grooves and receives therein edge portions of the mirro, with means manually settable and coacting between the walls of said frame grooves and the top and bottom edges of the mirror for engaging said edges to shift the mirror in its own plane and to bring the said sharp front vertical.

12. An apparatus for taking in sections images of a wide scene or object on a corresponding number of films for subsequent mosaic combining comprising two cameras each having a lens system with control means for changing its focus, said lens system having the characteristic of maintaining substantially constant in-focus and out-of-focus images of an object and of maintaining substantial constancy field size with change in focus, an aperture, and means for presenting film at the latter for image recording; each of said cameras having an angle of view less than the angle of the scene or object and said cameras having supporting means in the form of a base plate on which they are associated together with their optical axes in a horizontal plane for dividing between them the angle of the scene or object into two adjacent edge-adjoining fields of view for the taking of corresponding image sections that are intended to substantially match at their adjoining edges when mosaically combined, one of said cameras being positioned on said base plate with its optical axis coincident with the axis of one of said fields of view and with the common vertex of both angles of view coincident with the entrance pupil of its lens system and the other camera being laterally and angularly displaced therefrom on said base plate, there being a mirror having a reflecting surface positionable vertically in the path of the pencil of light rays coming from the object section in the other angle of view to bend the optical axis of the latter into coincidence with the optical axis of said other camera and to converge said pencil of light at the entrance pupil of its lens system whereby optically both cameras view their respective scene sections from substantially the same point and parallax effects are thereby alleviated, said mirror having a relatively sharp front vertical edge formed by a bevelled non-reflecting surface that intersects the reflecting surface at an acute angle, said base plate carrying a frame open at its front end and receiving said mirror therein with its sharp front edge at the open front end of the frame, with means coacting between the mirror and its frame adapted for manually setting the mirror so that its reflecting surface is vertical together with means for setting the mirror and its sharp front edge to demarcate optically the dividing line between the adjacent angles of view and the adjacent object sections, said bevelled non-reflecting edge of the mirror falling substantially in the plane between the adjacent angles of view, each of said lens systems comprising a plurality of coaxial lenses of which at least one has means supporting it movably relative to the others for effecting change in focus and has a coaxial annular electromagnetic winding secured thereto that is co-axially entered into an annular flux gap provided in a coaxial magnetic core structure whereby an intense magnetic field is effective across said flux gap for coaction with said winding; a source of electrical energy with circuit connections for energizing the electromagnetic windings of all of said lens systems; and means for controlling the energization thereof for effecting in-step and synchronous shifts of the movable lenses and thereby effect the same changes in focus in all the lens systems, whereby the accompanying constancy of field sizes alleviates mismatch at said adjoining edges that would otherwise be caused by relative change in field sizes.

13. The improvements as claimed in claim 12 in which said magnetic core structure includes a permanent magnet of high coercive force and the magnetic field across said flux is unidirectional, said force of electrical energy comprising means supplying periodically-changing current for energizing all of said annular electromagnetic windings therewith and thereby effect oscillation of each winding axially of its flux gap to synchronously oscillate all of said movable lenses each coaxially of its associated lenses, and in which said controlling means comprises means for correlating the magnitudes of the respective currents energizing said windings so that the stroke of each movable lens is the same in extent and location along the optical axis of its lens system.

14. The improvements as claimed in claim 12 in which said magnetic core structure includes a permanent magnet of high coercive force and the magnetic field across said flux gap is unidirectional, said source of electrical energy comprising means supplying unidirectional current for energizing all of said annular electromagnetic windings therewith, the unidirectional field in said flux gap and the unidirectional field produced by the winding therein reacting to produce an axial force on the winding and thereby substantially fix the location of the winding and its lens axially of the remaining lenses of its lens system, and in which said controlling means comprises means for correlatingly changing at will the energization of said annular windings so that for each change of winding energization the respective movable lenses are shifted each to the same extent and each to the same location relative to its associated lenses.

References Cited in the file of this patent

UNITED STATES PATENTS

| | | |
|---|---|---|
| 1,294,686 | McCormick | Feb. 18, 1919 |
| 1,391,029 | Wescott | Sept. 20, 1921 |
| 1,735,109 | Eliel | Nov. 12, 1929 |
| 2,008,924 | Owens | July 23, 1935 |
| 2,025,731 | Dieterich | Dec. 31, 1935 |
| 2,176,108 | Smith | Oct. 17, 1939 |
| 2,198,815 | Haskin | Apr. 30, 1940 |
| 2,207,419 | Smith | July 9, 1940 |
| 2,337,363 | Ames | Dec. 21, 1943 |
| 2,711,668 | Dresser | June 28, 1955 |

FOREIGN PATENTS

| | | |
|---|---|---|
| 385,423 | France | Mar. 16, 1908 |

UNITED STATES PATENT OFFICE
CERTIFICATE OF CORRECTION

Patent No. 2,896,503                                                      July 28, 1959

Philip Stanley Smith

It is hereby certified that error appears in the printed specification of the above numbered patent requiring correction and that the said Letters Patent should read as corrected below.

Column 17, line 24, for "portions $144^b$" read -- portions $144^f$ --; column 21, line 21, for "strippled" read -- stippled --; column 28, line 3, for "screne" read -- scene --; column 34, line 2, for "isosceles triangles, as by suitably spaced screws 125" read -- isosceles triangles as above described; the holders may be --; column 44, line 72, for "lens system N-11," read -- lens systems U-11, --; column 47, line 26, for "ratation" read -- rotation --; column 52, line 30, for "windless" read -- windlass --.

Signed and sealed this 29th day of December 1959.

(SEAL)

Attest:

KARL H. AXLINE
Attesting Officer

ROBERT C. WATSON
Commissioner of Patents